United States Patent
Yiu

(10) Patent No.: US 6,786,415 B2
(45) Date of Patent: Sep. 7, 2004

(54) MEMORY CARD CONNECTOR

(76) Inventor: Jung-Hua Yiu, Fl. 2, No. 1, Lane 11, T8-Chiang St., Tu-Cheng, Taipei (TW)

(*) Notice: Subject to any disclaimer, the term of this patent is extended or adjusted under 35 U.S.C. 154(b) by 0 days.

(21) Appl. No.: 10/299,690

(22) Filed: Nov. 20, 2002

(65) Prior Publication Data

US 2004/0056095 A1 Mar. 25, 2004

(30) Foreign Application Priority Data

Aug. 6, 2002 (TW) .................................... 91212108 U
Aug. 23, 2002 (TW) .................................... 91213079 U

(51) Int. Cl.[7] ................................................ G06K 7/00
(52) U.S. Cl. ...................... 235/486; 235/483; 235/492
(58) Field of Search ................................ 235/486, 483, 235/492, 453, 479, 482

(56) References Cited

U.S. PATENT DOCUMENTS

| | | | | |
|---|---|---|---|---|
| 4,887,188 A | * | 12/1989 | Yoshida et al. ............. | 361/684 |
| 5,533,906 A | * | 7/1996 | Abe ............................ | 439/159 |
| 5,709,568 A | * | 1/1998 | Pan et al. ................. | 439/541.5 |
| 5,877,488 A | * | 3/1999 | Klatt et al. ................. | 235/486 |
| 5,905,253 A | * | 5/1999 | Ito et al. ..................... | 235/486 |
| 6,134,114 A | * | 10/2000 | Ungermann et al. ........ | 235/486 |
| 6,206,710 B1 | * | 3/2001 | Chen .......................... | 439/159 |
| 6,324,064 B1 | * | 11/2001 | Schneider ................... | 361/737 |
| 6,478,615 B1 | * | 11/2002 | Kuo .......................... | 439/541.5 |
| 6,503,092 B1 | * | 1/2003 | Sato .......................... | 439/159 |
| 6,557,761 B1 | * | 5/2003 | Oya et al. ................... | 235/441 |
| 6,648,694 B2 | * | 11/2003 | Takamori et al. ........... | 439/630 |
| 2003/0111541 A1 | * | 6/2003 | Washino et al. ............ | 235/492 |

* cited by examiner

Primary Examiner—Michael G. Lee
Assistant Examiner—Uyen-Chau N. Le

(57) ABSTRACT

A memory card connector includes a main body and a slide plate. There are a plurality of terminals, a halt prevention hook and a slide rail in the main body. The slide plate has a rod, an opening at one end enabling insertion of a memory card a plurality of jacks extending to the other side thereof. Each jack has a guided chamfer therein, and each terminal is bent at the middle part thereof to form a pressing structure to avoid direct abrasion of the chip on the memory card as well as to avoid misinsertion or misejection of the memory card. With a special fastener on the memory card connector, the memory can connector can be coupled with another memory card connector (may be of a different size or specification) for hosting more memory cards.

5 Claims, 25 Drawing Sheets

MEMORY CARD CONNECTOR

FIELD OF THE INVENTION

This invention relates to a memory card connector, and more particularly to a memory card connector that can work with different memory cards; wherein said connector can avoid direct friction between the chip on the memory card and the terminals based on the special structure of pressing terminal and with the halt prevention hook and the guided rod, said connector helps to determine whether the memory card is misinserted as well as avoid misejection of the memory card. Furthermore, with a special fastener on it, said connector can be coupled with a memory card of a different size or specification to form an assembly that can host different memory cards.

BACKGROUND OF THE INVENTION

Memory cards are usually used as a storage media for digital peripheral equipment. As there are different types of digital products in the market and they can work only with specific memory cards, memory cards are often made into different sizes or specifications to adapt to specific digital products. Therefore, users always find they cannot use the memory cards because of the low changeable of the digital products. Currently, a universal memory card connector is available in the market, someone provided one kind of memory card connector, which can support the following 4 types of memory cards: Smart Media Card, Secure Digital Card, Multimedia Card, and Memory Stick Card. Though the memory card connector can work with 4 different types of memory cards, it has the following shortcomings in actual application:

1. When a memory card is inserted into the memory card connector, the chip on that memory card has to contact with the I/O terminals on the memory card connector. However, in insertion of the memory card, the chip will abrade the terminals on the card connector, resulting in abrasion of the chip on the memory card and finally loose contact between the chip and the terminals on the card connector.
2. Though some memory card connectors that work with different memory cards may form into assemblies with the memory cards quickly, they shall work with the help of a PCMCIA interface equipped in the notebooks and desktops, resulting in the narrow application field.
3. Memory cards are often misinserted due to carelessness, thus the chip on the memory cards don't contact with the terminals on the card connector, resulting in the memory card unworkable.
4. In case a memory card is misinserted, the user may assume that the memory card or the digital peripheral equipment is failed and reparation work may be necessary. Such cases not only add the workload to maintenance and reparation personnel, but also bring inconvenience to the user.
5. Though some existing memory card connectors have a card ejector component, misactions may often occur due to the ineffectiveness of the card ejectors, resulting in the occurrence of badness ratio.

In consideration of above problems, the inventor provides an improved memory card connector that can work with different types of memory cards.

SUMMARY OF THE INVENTION

The purpose of this invention is to provide a memory card connector comprising a main body and a slide plate, wherein said main body can be coupled with a cover, and it has an opening on one end to enable insertion of a memory card. There is a plurality of terminals and springs at certain positions in the main body. The slide plate can move forward and backward in the main body. The slide plate has a socket on one side to enable the insertion of a memory card, and it has a plurality of jacks extending to the other side to host the terminals. Each jack has a guided chamber in it, and it is bent at the middle part to form a pressing structure.

In actual applications, when a memory card is inserted into the socket on the slide plate via the opening on the main body, the memory card will push the slide plate to move forward, thus the guided chamber on the slide plate will press down the pressing structures on the terminals to make the terminals contact with the chip on the memory card. In this way, the friction between the chip on the memory card and the terminals on the card connector can be avoided, eliminating any abrasion of the chip.

Another purpose of this invention is to provide a memory card connector, wherein when the cover of said memory card is removed, the memory card connector can be coupled with another memory card connector with the fastener on the main body to form an assembly, which can work with different types of memory cards, minimizing the size and cost.

Another purpose of this invention is to provide a memory card connector, wherein the slide plate has a rod in it and a halt prevention hook against the main body. Said rod can move forward and backward in the guided groove in the slide plate. With that structure, in case a memory card is misinserted, the slide plate and the memory card will be blocked by the halt prevention hook and will not be pushed forward as the memory card can't push the guided rod, which in turn can't press down the halt prevention hook. Thus, the user will notice his/her wrong action and correct it at once.

Another purpose of this invention is to provide a memory card connector, wherein the main body has a slide rail and the slide plate has a guided rod at the position where the slide plate faces against the slide rail. The guided rod can move along the slide rail when the slide plate moves forward and backward on the main body. The slide rail has the first notch, the second notch, the third notch, and the fourth notch, each of which is of a specific height. Those notches are designed to avoid misejection of the memory card.

The structure, efficacy, and principle of this invention is further detailed in the following illustrations and description.

DESCRIPTION OF THE SYMBOLS

| | | | |
|---|---|---|---|
| 1 | Main Body | 11 | Containing Part |
| 12 | Opening | 13 | Through Hole |
| 14 | Bulge | 15, 15' | Terminal Seat |
| 151, 151' | Terminal | 152 | Pressing Structure |
| 16 | Jack | 161 | Terminal |
| 17 | Seat | 18 | Slide Rail |
| 181 | First Notch | 182 | Second Notch |
| 183 | Third Notch | 184 | Fourth Notch |
| 19 | Halt prevention Hook | 191 | Clamp |
| 192 | Hook | 193 | Extending Part |
| 2 | Slide Plate | 21 | Guided Groove |
| 211 | Fastener | 212 | Blocking Part |
| 213 | Flange | 22 | Opening |
| 221 | Jack | 222 | Guided Chamber |
| 23 | Socket | 231 | Slot |
| 24 | Hooking Part | 25 | Hook |
| 251 | Spring | 26 | Fixing Seat |
| 261 | Guided Rod | 27 | Rod |
| 271 | Connecting Part | 272 | Guided Chamber |
| 273 | Flange | 28 | Blocking Part |
| 3 | Cover | 31 | Through Hole |
| 4 | Memory Card Connector | 41 | Slot |
| 42, 42' | Terminal Seat | 421 | Terminal |
| 43 | Coupling Part | 431 | Location Hole |
| 44 | Guided Groove | 441 | Location Hole |
| 442 | Pressing Part | 45 | Pushing Rod |
| 46 | Through Hole | 461 | Fixing Rod |
| 462 | Blot | 47 | Connecting Groove |
| 471 | Jack | 48 | Connecting Port |
| 481 | Leg | 5 | Circuit Board |
| 51 | Through Hole | 52 | Contact |
| A, B, C, D | Memory Card | A1, C1 | Chip |
| C2 | Notch | | |

DETAILED DESCRIPTION OF THE INVENTION

Figure 1:
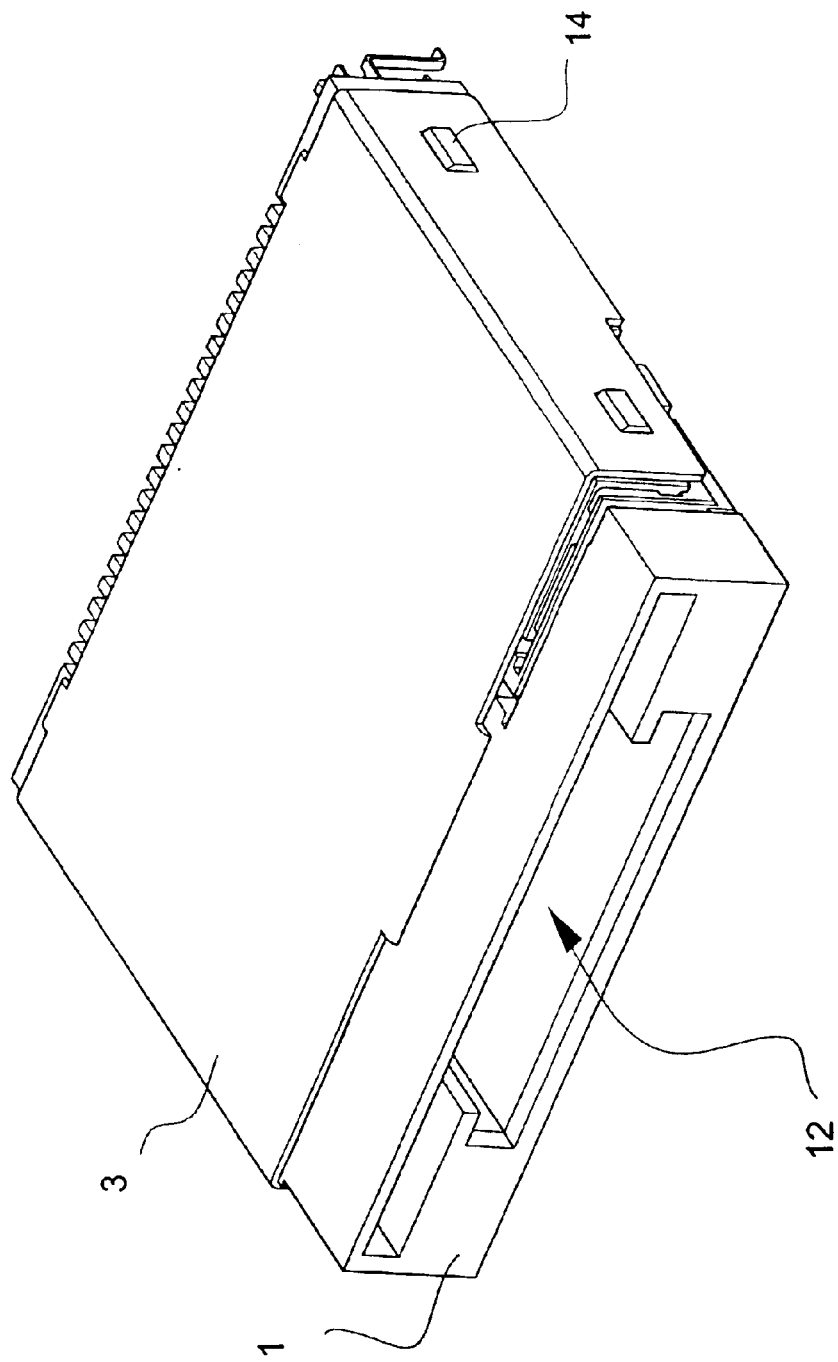
FIG. 1 is a 3D assembly view of a preferred embodiment implemented according to this invention.
Figure 2:
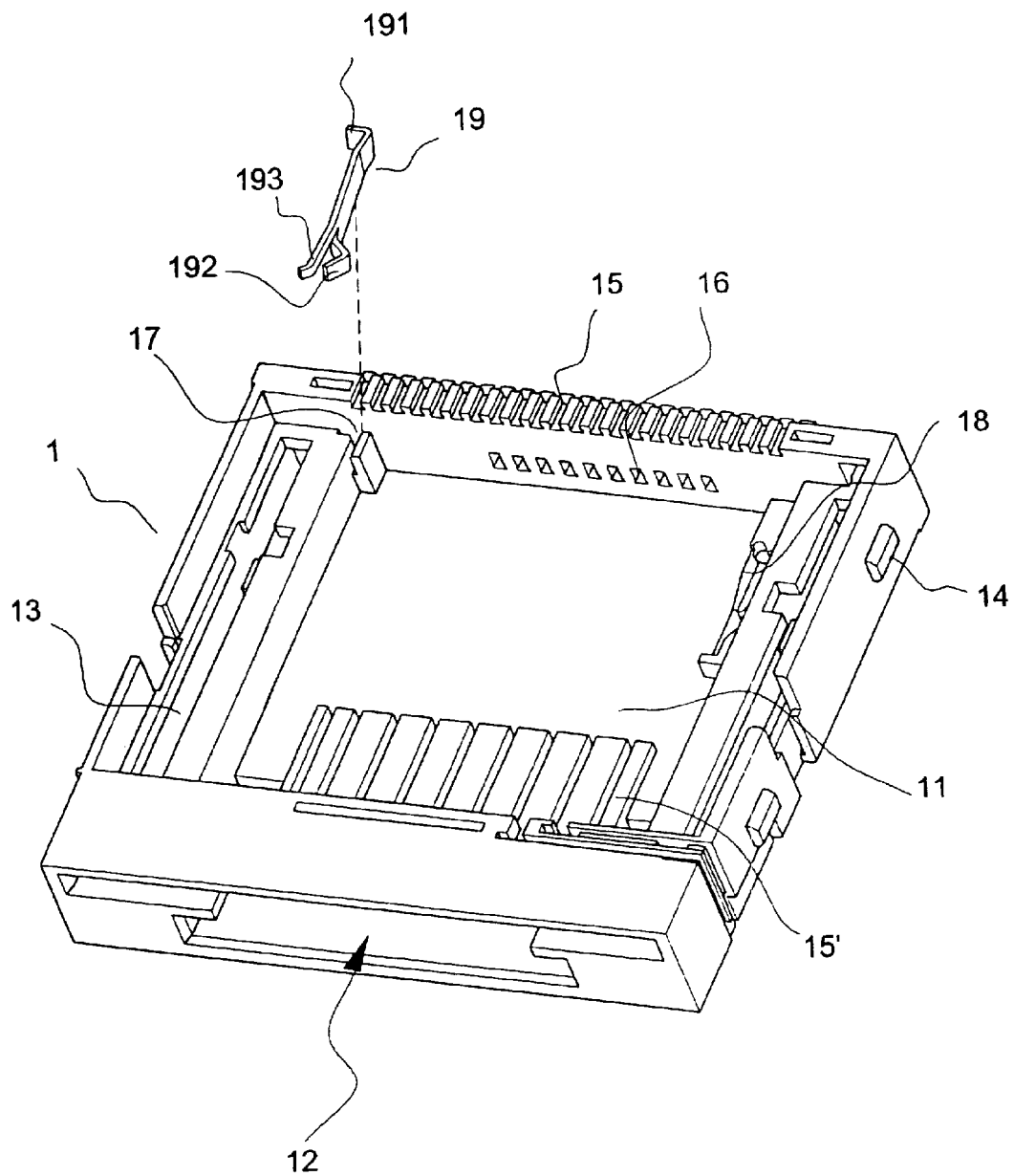
FIG. 2 is an abridged general view (1) of the structure of a preferred embodiment implemented according to this invention.
Figure 3:
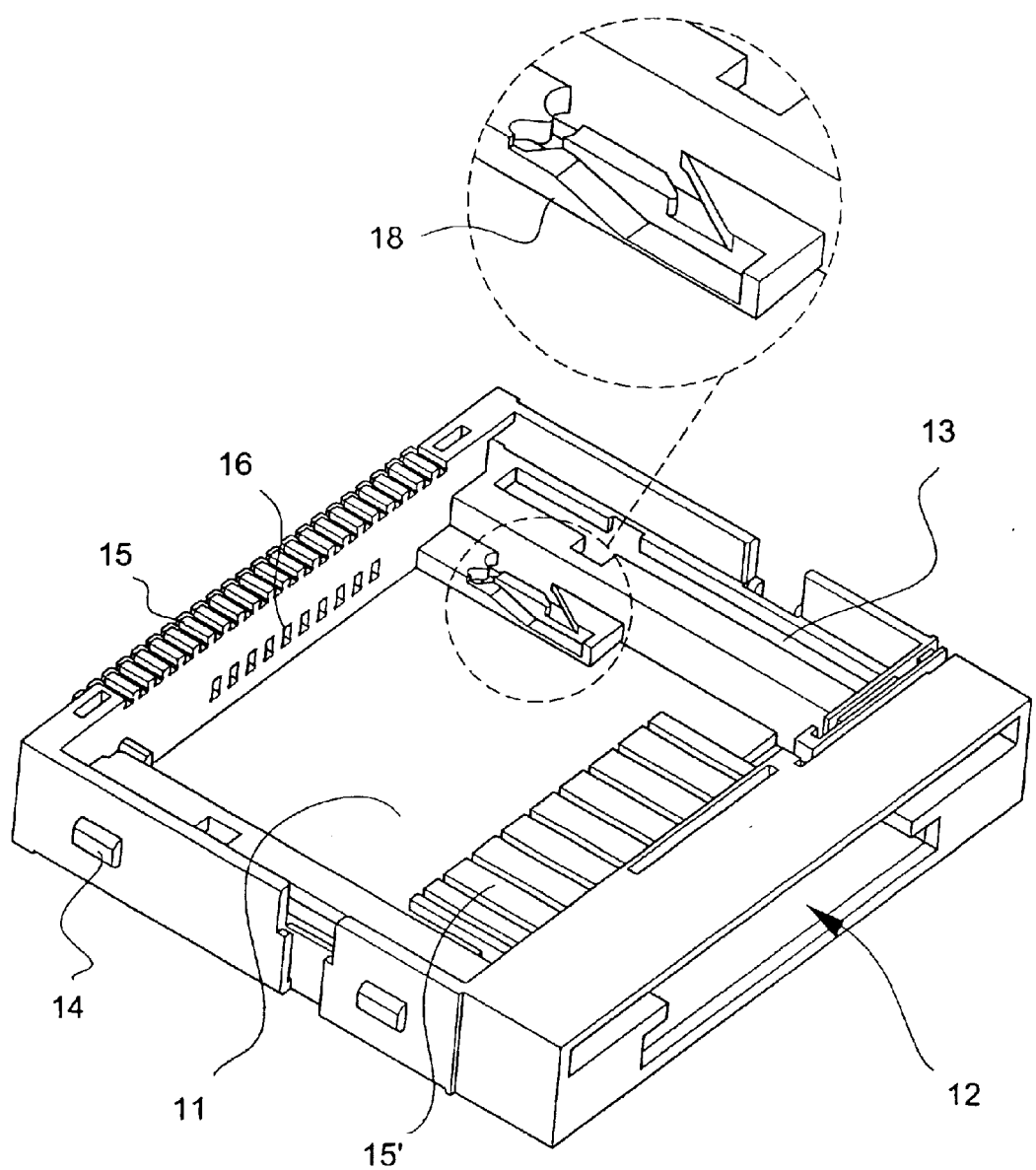
FIG. 3 is an abridged general view (2) of the structure of a preferred embodiment implemented according to this invention.
Figure 4:
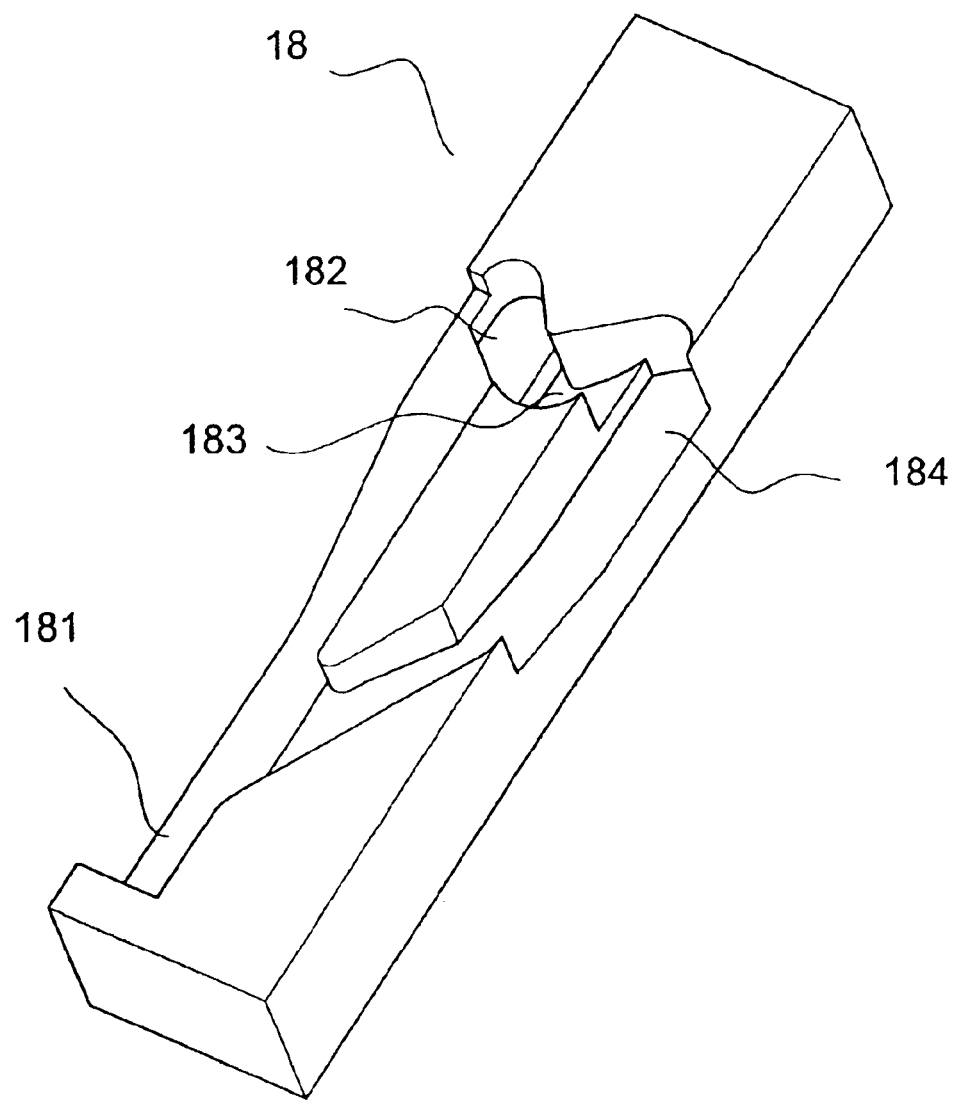
FIG. 4 is an abridged general view of the slide rail of a preferred embodiment implemented according to this invention.
Figure 5:
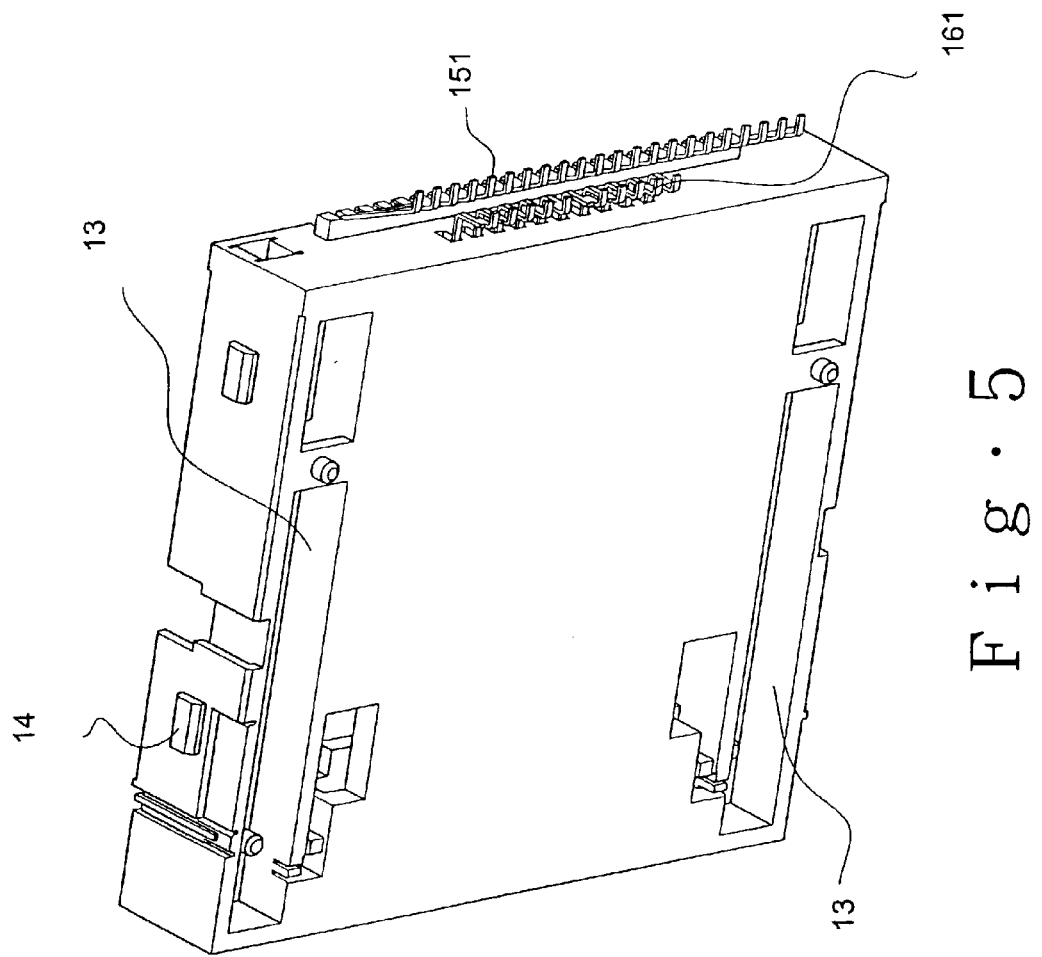
FIG. 5 is an abridged general view of the main body with terminals of a preferred embodiment implemented according to this invention.
Figure 6:
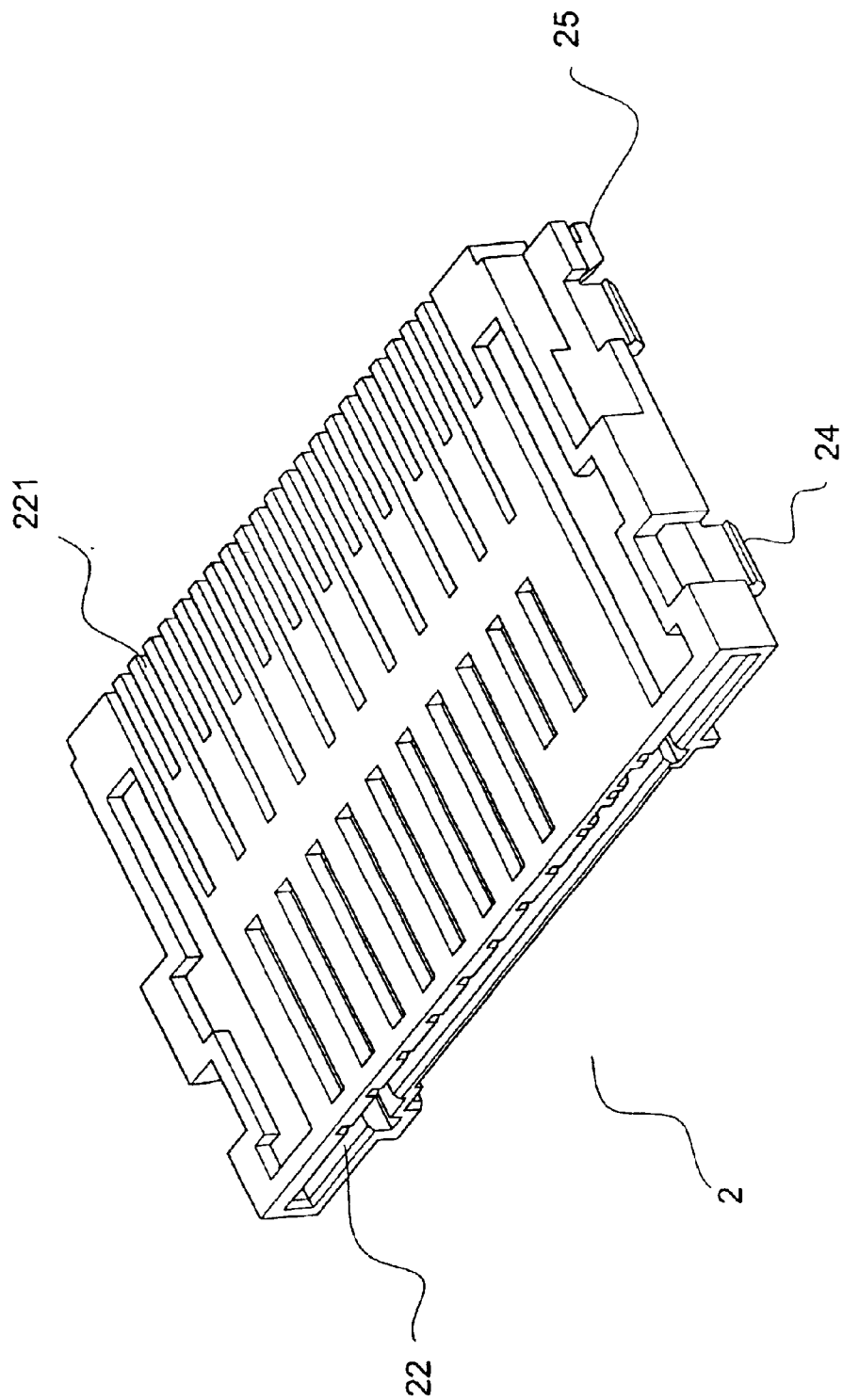
FIG. 6 and FIG. 7 are abridged general views of the slide plate' appearance of a preferred embodiment implemented according to this invention.
Figure 7:
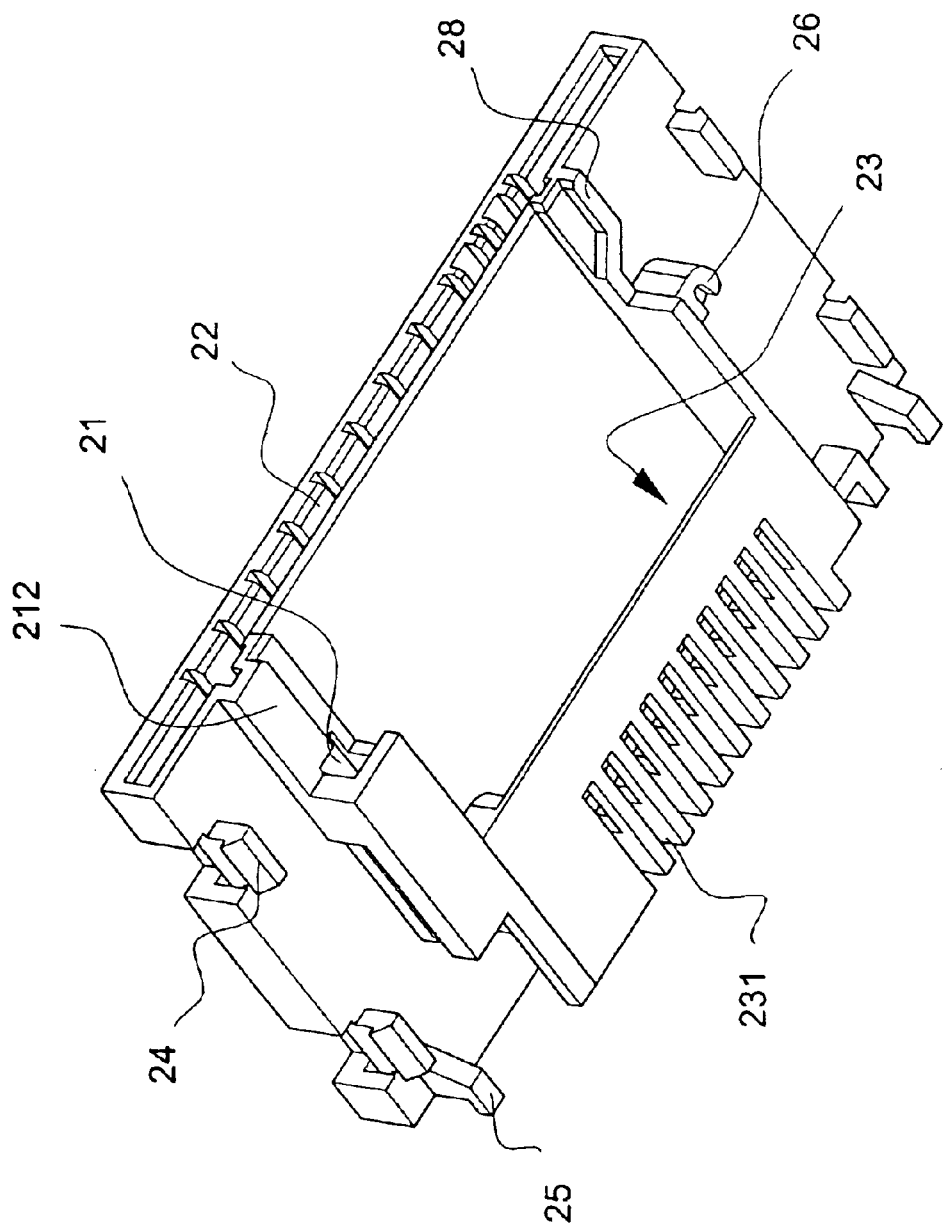
Figure 8:
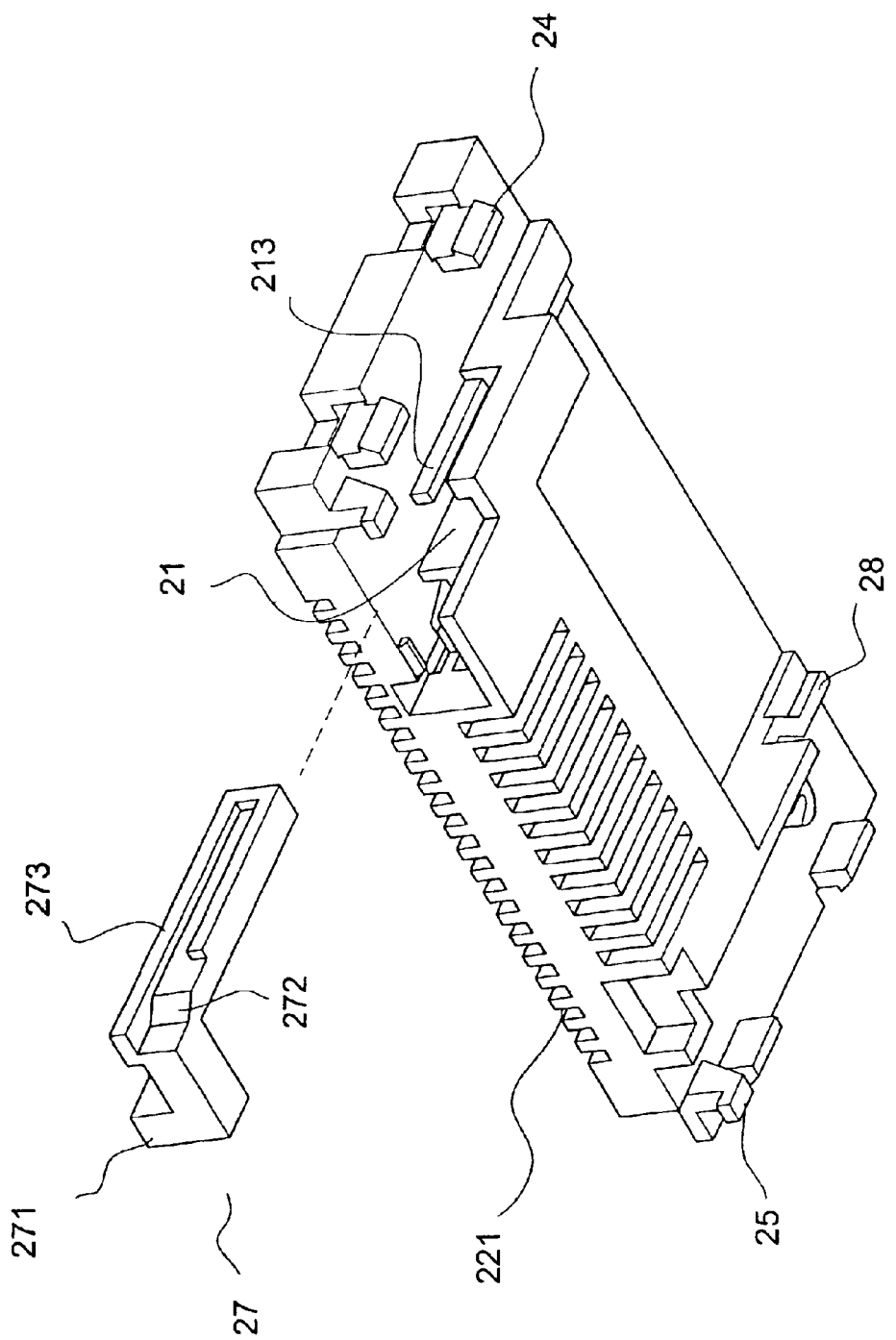
FIG. 8 and FIG. 9 are assembly views of the slide plate of a preferred embodiment implemented according to this invention.
Figure 9:
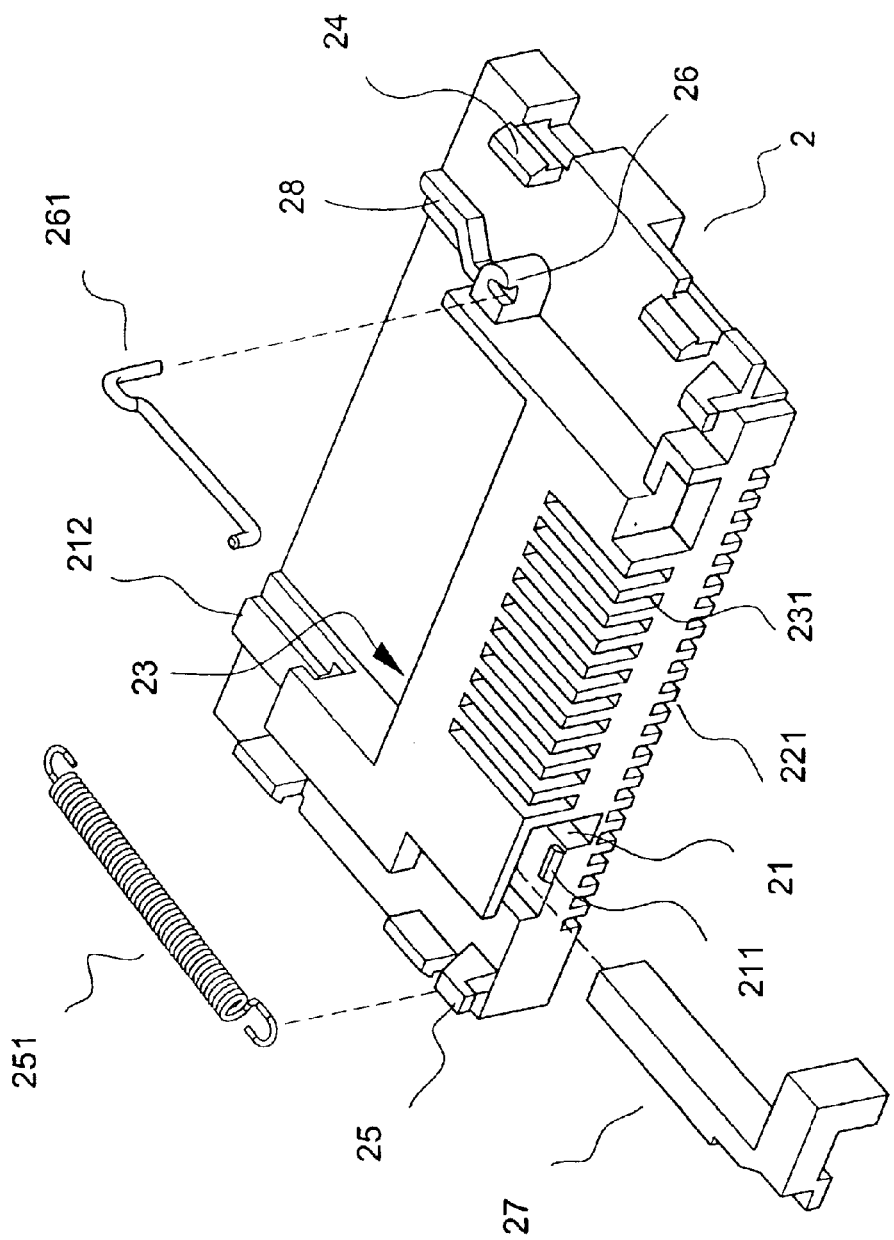
Figure 10:
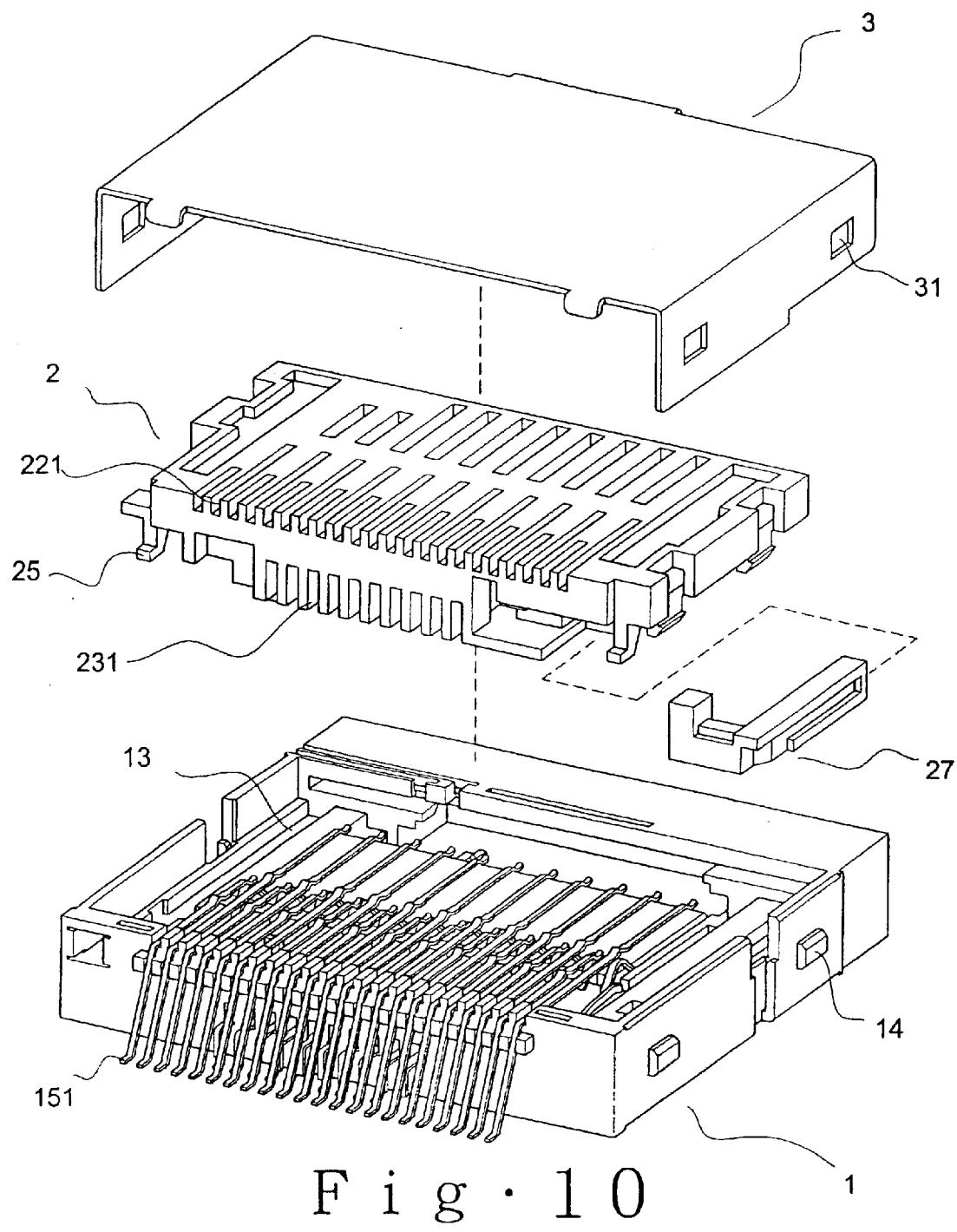
FIG. 10 is a 3D exploded view of a preferred embodiment implemented according to this invention.

FIG. 1 is a 3D assembly view of a preferred embodiment implemented According to this invention. From the drawing we can see that the invention mainly comprises a main body 1, a slide plate 2, and a cover 3. There is a containing part 11 at the center of the main body 1 (refer to FIG. 2), and there is an opening 12 at one side of the main body to enable insertion of different memory cards A, B, or C (refer to FIG. 12). There is a terminal seat 15' at one end of the opening 12 of the main body 1 to fix the terminals 151', and there are a terminal seat 15 and a jack 16 at the other end of the main body 1 to fix the terminals 15 and terminals 16. There is a plurality of bulges 14 on the circumference of the main body 1. There is a through hole 13 on the bottom part of each side of the containing part 11 (refer to FIG. 5), and there are a seat 17 to fix the halt prevention hook 19 and a slid rail 18 to enable the guided rod 261 to move forward and backward near each through hole 13 (refer to FIG. 3). The halt prevention hook 19 is made of an elastic material, and it is bent on both ends to form a clamp 191 on one end and a hook 192 and an extending part 193 on the other end. The slide rail 18 has the first notch 181, the second notch 182, the third notch 183, and the fourth notch 184 (refer to FIG. 4), and each notch is of a specific height. The slide plate 2 can be placed into the containing part 11 of the main body, and it has a plurality of slots 22 at one end to enable insertion of a memory card A (refer to FIG. 6) and a plurality of jacks 221 extending to the other end to host terminals 151. Each jack 221 has a guided chamber 222 in it (refer to FIG. 13), and each the terminal 151 is bent at the middle part to form a pressing structure 152. There is a plurality of slots 231 to enable insertion of terminals 161 (refer to FIG. 7). The slots 231 are connected to a socket 23 to host a memory card B. There is a fixing seat 26 to fix a guided rod 261 near the socket 23 (refer to FIG. 9). There is a blocking part 28 near the fixing seat 26, and the slide plate 2 has a plurality hooking parts 24 and a hook 25 to hook a spring 251 on each side of it. There is a guided groove 21 at a certain position on the slide plate 2, extending to one end (refer to FIG. 7). Said guided groove can host a rod 27 and enable the rod 27 to slide forward and backward in it. There is a bulge 211 on one end of the guided groove 21 and a blocking part 212 on the other end of the guided groove 21. There is a flange 213 on one side of the guided groove 21. Thus the rod 27 can slide in the guided groove and can't slide out of it. There is a flange 273 and a guided chamber 272 on one side of the rod 27 (refer to FIG. 8), and a connecting part 271 extends from the guided chamber 272. The cover 3 has through holes 31 on both sides to couple with the bulges 14 on the main body (refer to FIG. 10).

Figure 11:
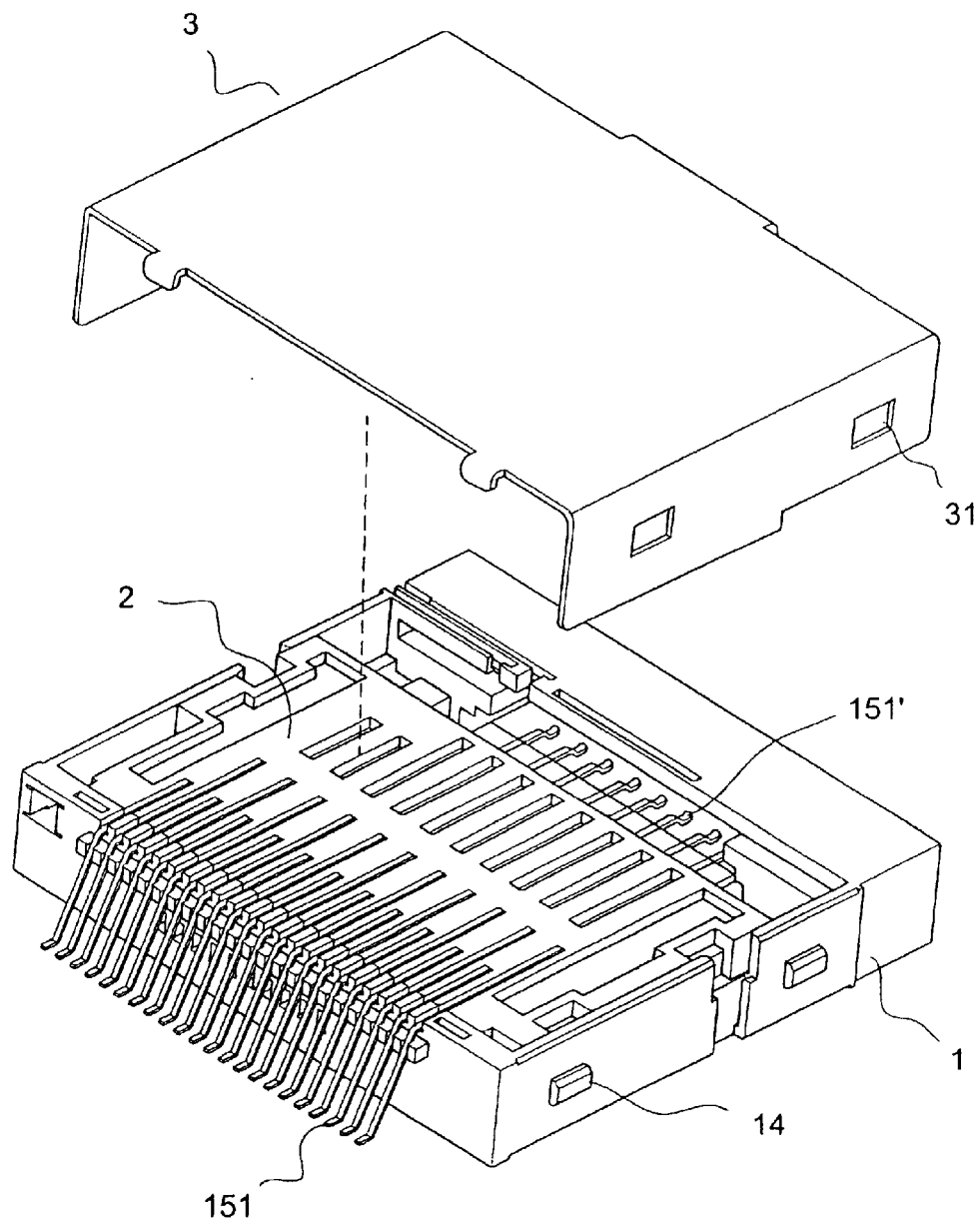
FIG. 11 is an assembly view of a preferred embodiment implemented according to this invention.
Figure 15:
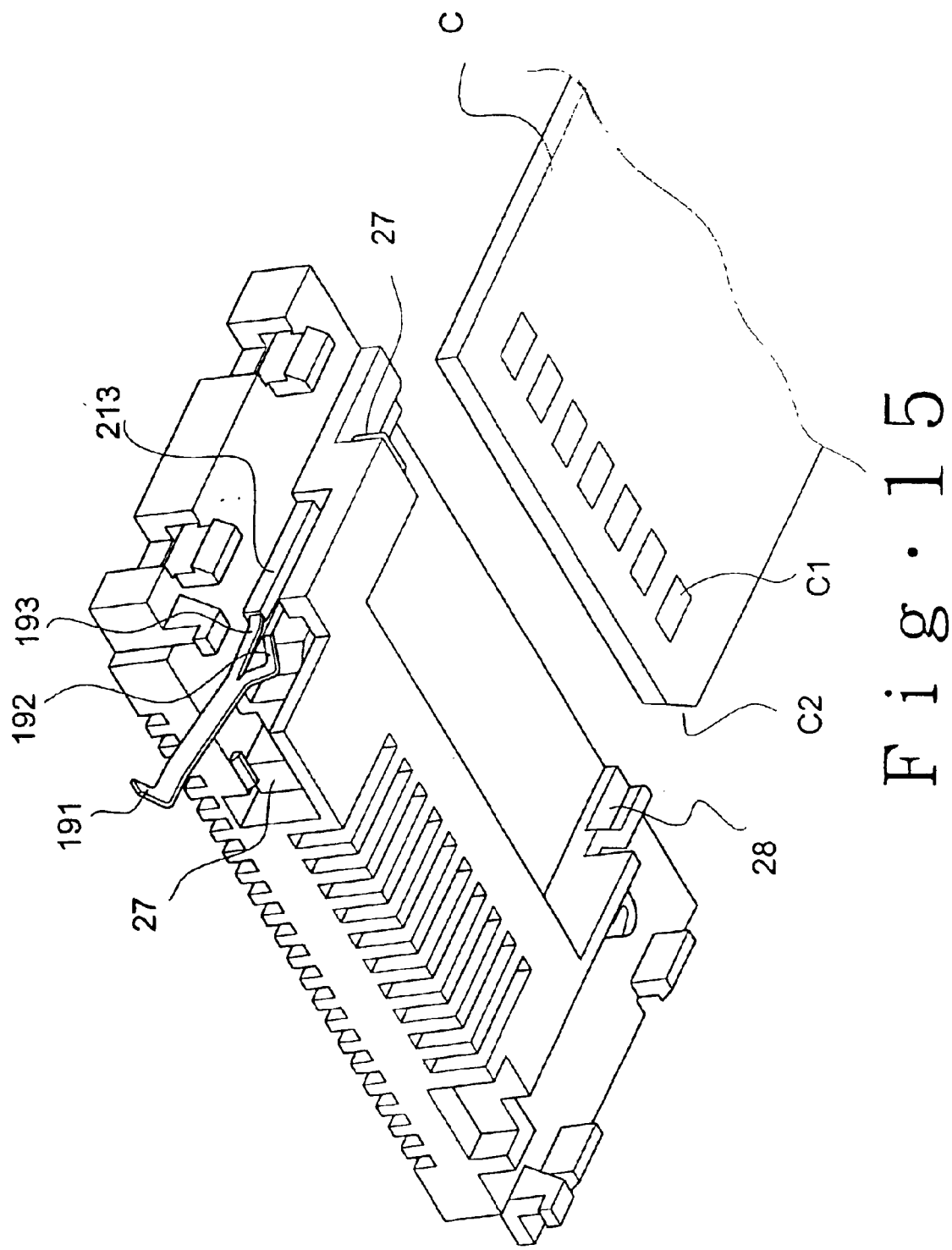
FIG. 15 and FIG. 16 are abridged general view of procedures for correct insertion of a memory card into the memory card connector in this invention.

In assembly, firstly, place the rod 27 into the guided groove 21 on the slide plate 2, insert and fix the guided rod 261 into the fixing seat 26, and attach the springs 251 onto the corresponding hooks 25; then place the assembled slide plate 2 in the containing part 11 of the main body 1 and couple the hooking part 24 on both sides of the slide plate 2 with the through holes 13 on the main body 1; and fix the other end of each spring 251 on the hook 25 onto the main body 1. In this way, the slide plate can slide forward and backward in the containing part 11 of the main body 1. Then, insert the terminals 151, 151', 161 into the corresponding terminal seats 15, 15' and the terminal jacks 16, wherein, the terminals 151 are inserted into corresponding jacks 221 on the slide plate 92 via the terminal seat 15 on the main body 1 refer to FIG. 13 to make the extending part 193 of the halt prevention hook 19 prop on the flange 213 of the slide plate 2 refer to FIG. 15; then place the guided rod 261 on the slide plate 2 into the slide rail 18 of the main body 1 (refer to FIG. 18); finally, fit the cover 3 on the main body 1 (refer to FIG. 11) to make the through holes 31 on the cover 3 couple with the bulges 14 on the main body. Then the assembled structure can be fixed into a DSC or a multimedia AN device.

Figure 12:
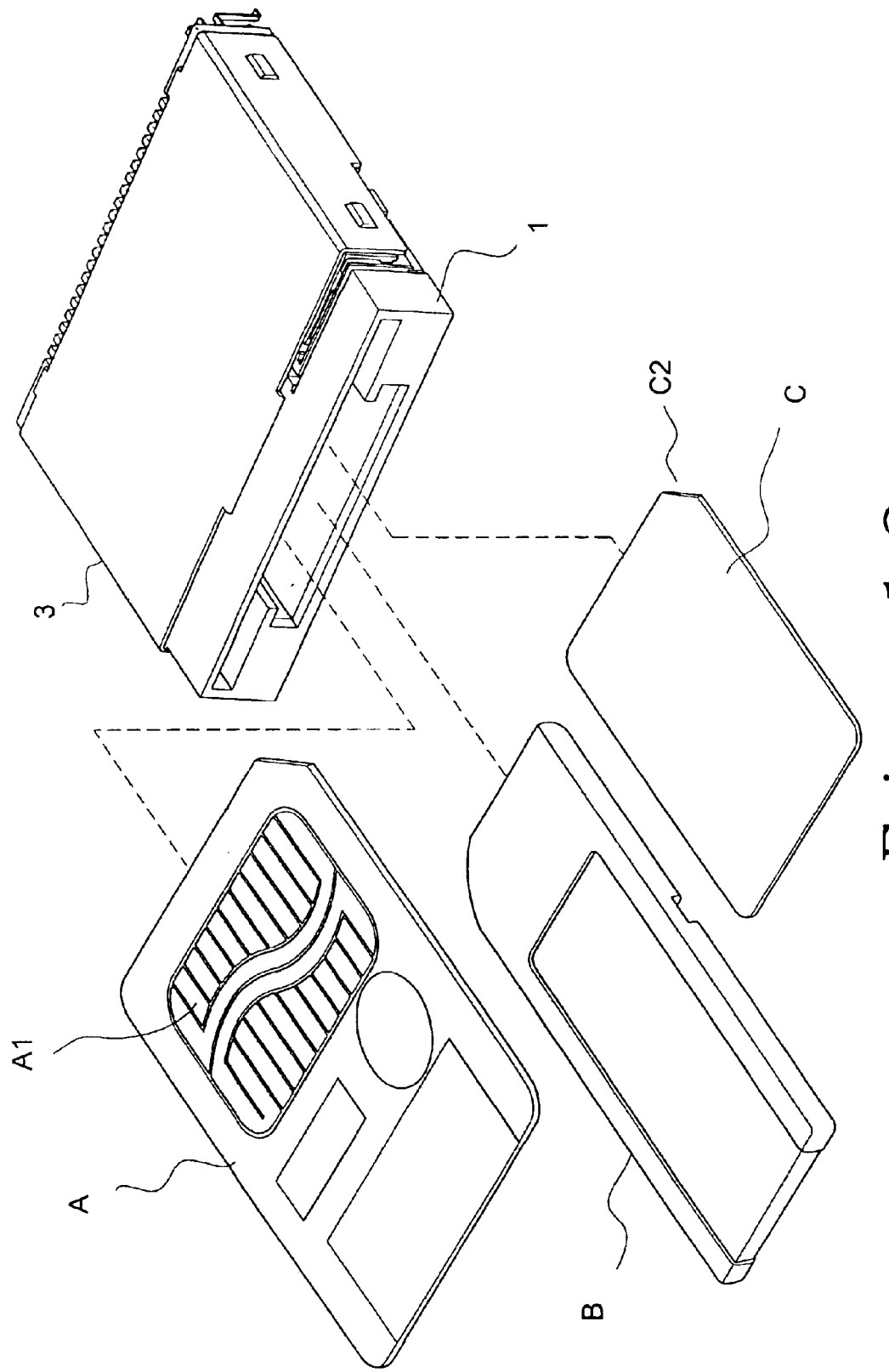
FIG. 12 is an application view of a preferred embodiment implemented according to this invention.

When in use, different memory cards A, B, C (e.g., Smart Media Card, Secure Digital Card, Multimedia Card, or Memory Stick Card) can be inserted into the assembly (refer to FIG. 12). With a CCD or an equivalent (not shown) and an opticalelectric component in the digital peripheral equipment, images or data can be saved into the chip A1 of memory card A (or B, C). Then, the assembly can be connected to a computer, which will access the information stored in the memory card A, B, or C.

Figure 13:
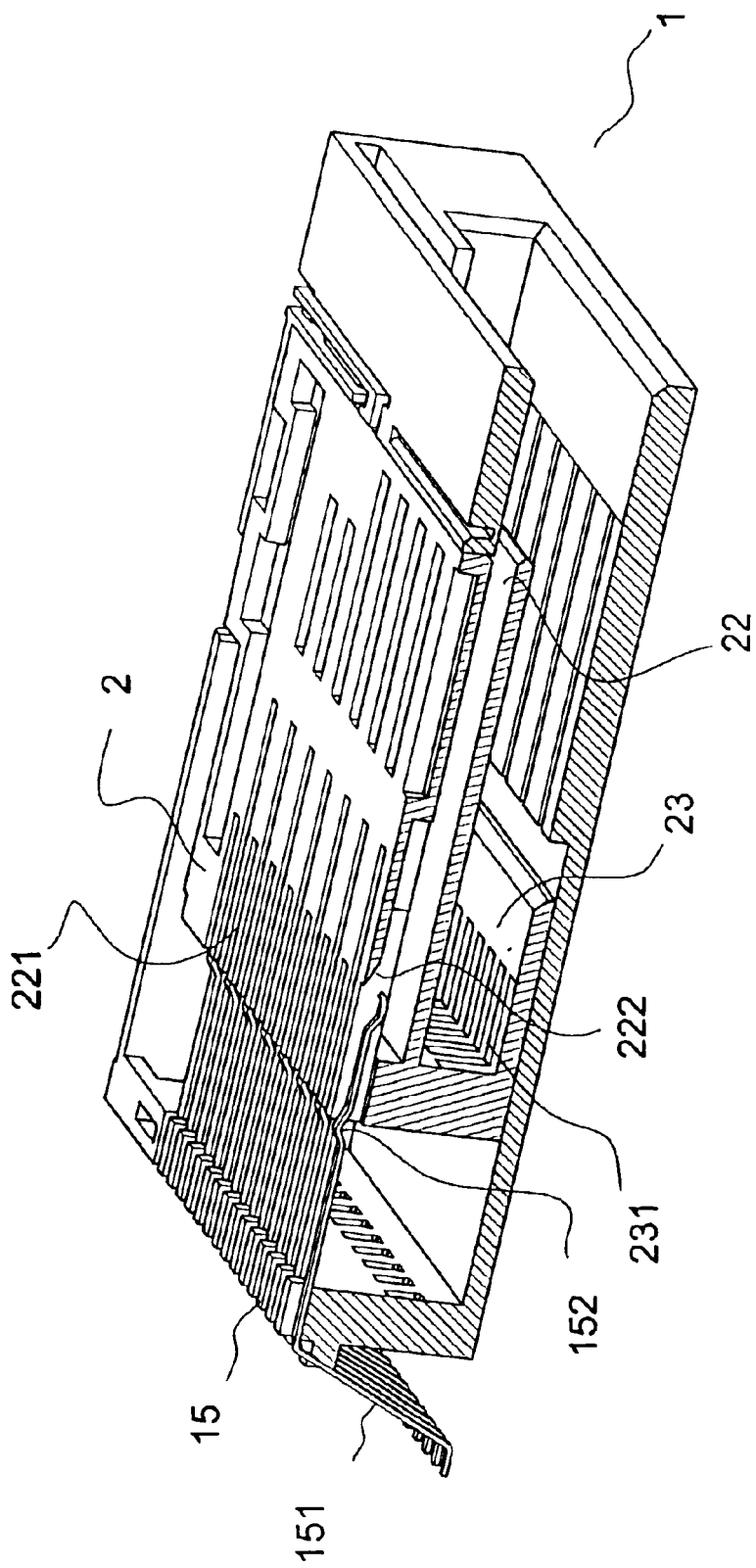
FIG. 13 is a sectional view (1) of a preferred embodiment implemented according to this invention.
Figure 14:
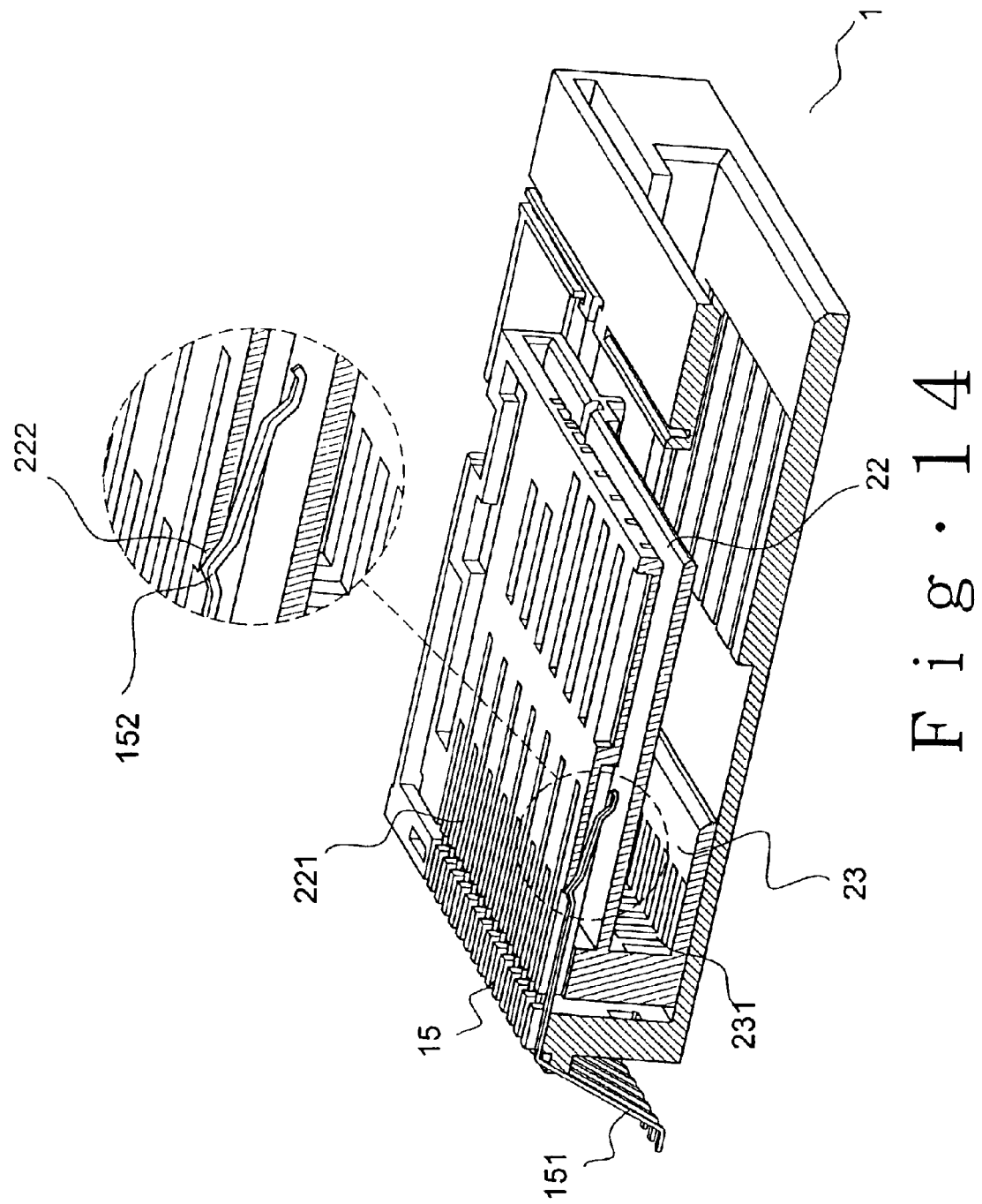
FIG. 14 is a sectional view (2) of a preferred embodiment implemented according to this invention.

FIG. 13 is a sectional view (1) of a preferred embodiment implemented according to this invention, wherein when no memory card A (or B, C) is inserted into the memory card connector in this invention, the slide plate 2 on the memory card connector is located at one end of the main body 1 under the pushing force of the spring 251. However, when memory card A is inserted into the opening 22 of the slide plate 2 via the opening 12 on the main body 1, it pushes the slide plate 2 to move forward, and the guided chamber 222 on the slide plate 2 will press down the pressing structures 152 of the terminals 151 (refer to FIG. 14) to make the terminals 151 contact with the chip A1 (not shown) on memory card A in that way, any abrasion of the chip A1 on the memory card A due to direct friction between the chip A1 and the terminals 151 will be avoided.

Figure 16:
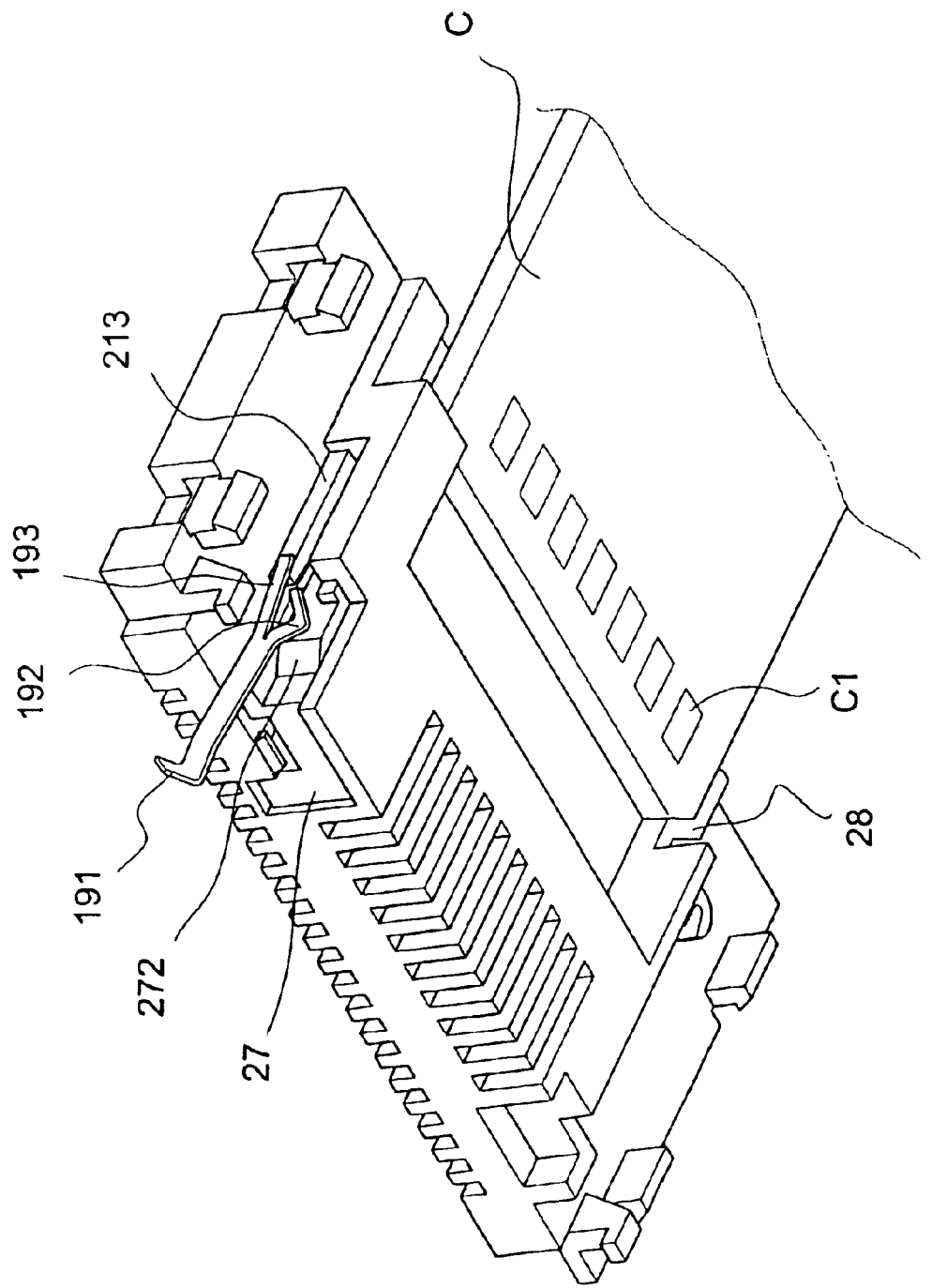
Figure 17:
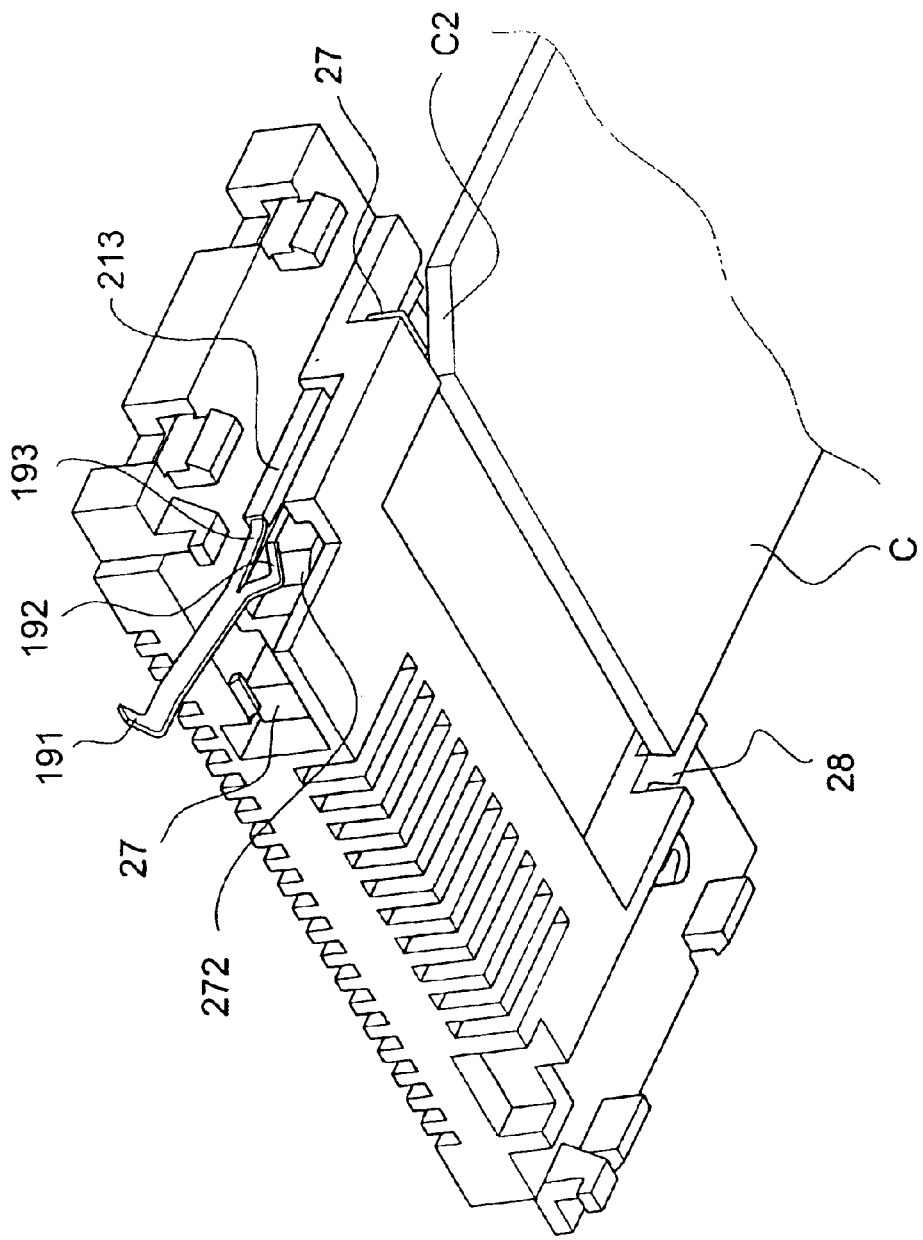
FIG. 17 is an abridged general view of the misinsertion of a memory card into the memory card connection in this invention.

When the memory card C is inserted into the memory card connector in this invention (refer to FIG. 15), the chip C1 on the memory card C will contact with the terminals 151' (not shown) on the main body 1 if memory card C is correctly inserted into the assembly, and the notch C2 on the memory card C will couple with the blocking part 28 on the slide plate 2 (refer to FIG. 16). When the memory card C pushes the rod 27 on the slide plate 2, it pushes the guided chamber 272 beside the rod 27 to press aside the hook 192 on the halt prevention hook 19. Thus the extending part 193 of the halt prevention hook 19 will slide aside to enable the slide plate 2 and the memory card C to move forward. Finally, the chip C1 on the memory card C will completely contact with the terminals 151' (not shown). However, if the memory card is misinserted (refer to FIG. 17), the memory card C can't be pushed forward due to the blocking of the blocking part 28 on the slide plate 2, thus it can't push the rod 27, and as the result, the rod 27 can't press aside the extending part 193 of the halt prevention hook 19, thus the flange 213 of the slide plate 2 is constantly propped by the extending part 193. In that case, the operator can easily notice the wrong operation and correct it at once.

Similarly, When the memory card A or B is correctly inserted into the opening of above memory card connector, it will push the rod 27 in the slide plate 2, which will in turn press aside the guided chamber 272 and press down the hook 192 on the halt prevention hook 19 to make the extending part 193 on the halt prevention hook 19 slide aside. As the result, the slide plate 2 and the memory card A or B can move forward.

Figure 18:
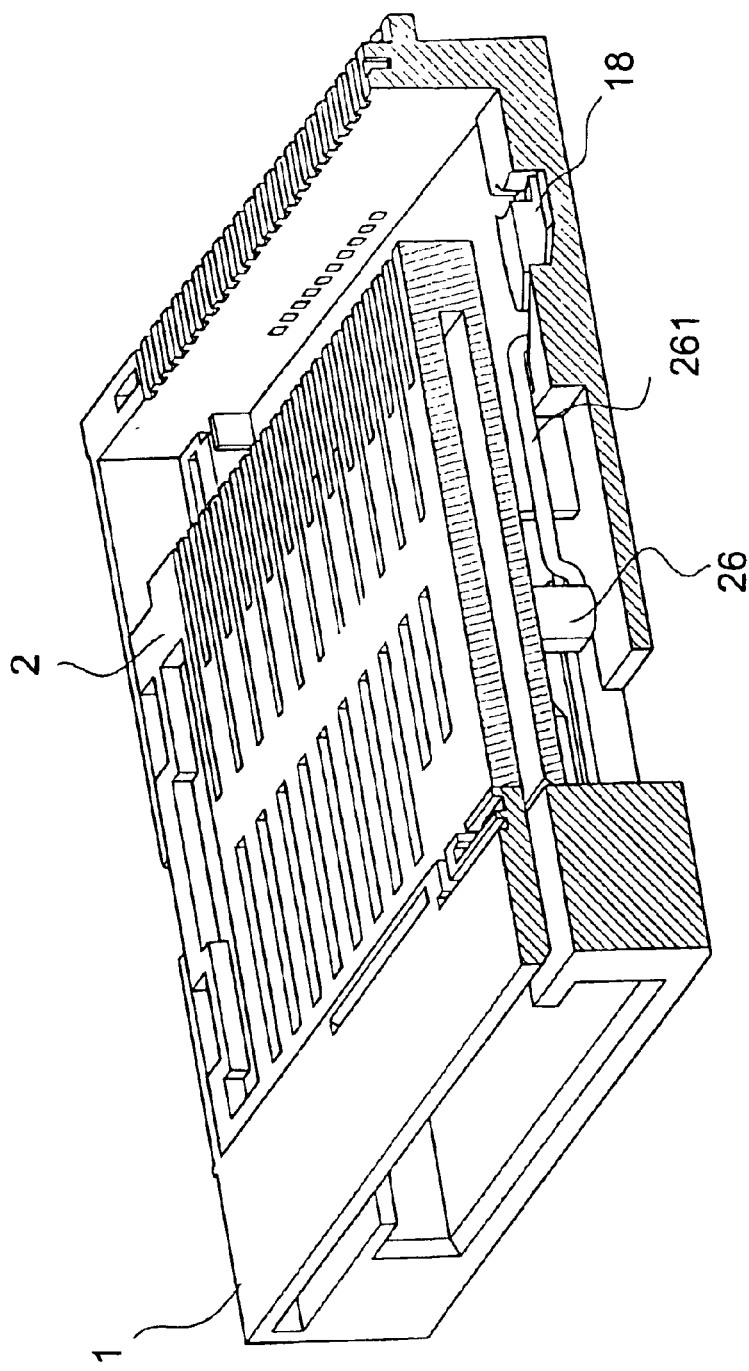
FIG. 18 and FIG. 19 are application view of a preferred embodiment implemented according to this invention, with the guided rod being at different positions on the slide rail.
Figure 19:
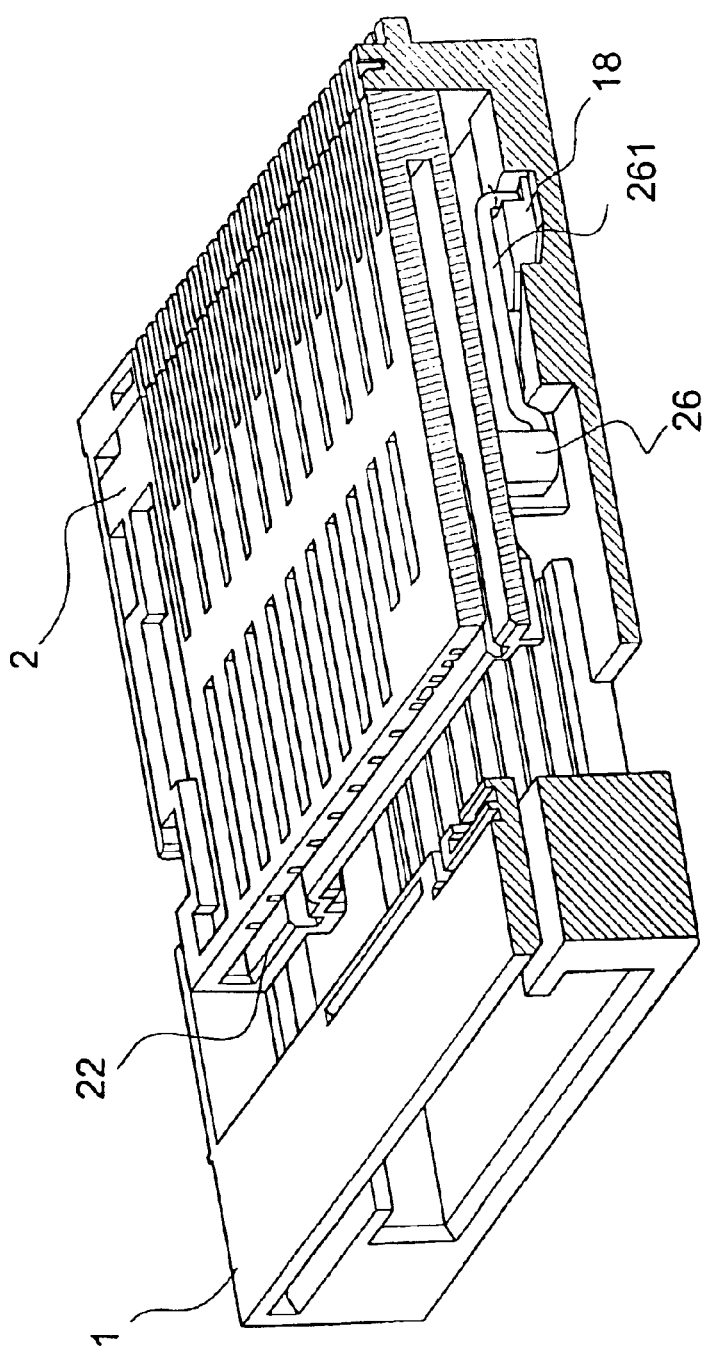

FIG. 18 and FIG. 19 show the actions of the slide rail of a preferred embodiment implemented according to this invention. Please refer to FIG. 4 at the same time. When no memory card A (or B, or C) is inserted into the memory card connection in this invention, the guided rod 261 on the slide plate 2 is located at the far end of the first notch 181 on the slide rail 18. When a memory card A or B or C is inserted into said connector, it pushes the slide plate 2, thus the guided rod 261 on the slide plate 2 will move towards the second notch. However, the guided rod 261 will not slide into the fourth notch 184, as the notch 184 is higher than the first notch 181. When the slide plate moves to the top of the main body, the guided rod 261 will slide into the second notch 182 because that the second notch is lower that the first notch. At this time, the slide plate 2 will move backward a bit under the pushing force of the spring 251, and the guide rod 261 will slide into the third notch 183 because the third notch 183 is lower than the second notch 182. Then, the guide rod 261 will wedge into the third notch 183 and be blocked there due to the sunk-arc shape of the third notch 183.

At ejecting the card, the operator may push the memory card A (or B, or C) forward to make the slide plate 2 move forward. Because the second notch 182 is higher that the third notch 183, any misaction of card ejection can be avoided. The guided rod 261 will directly slide into the fourth notch 184 because that the fourth notch 184 is lower a bit than the third notch 183. Then, the slide plate will return to it original position where no memory card is inserted under the pushing force of the spring 251, it will return to the first notch 181 from the fourth notch 184.

Figure 20:
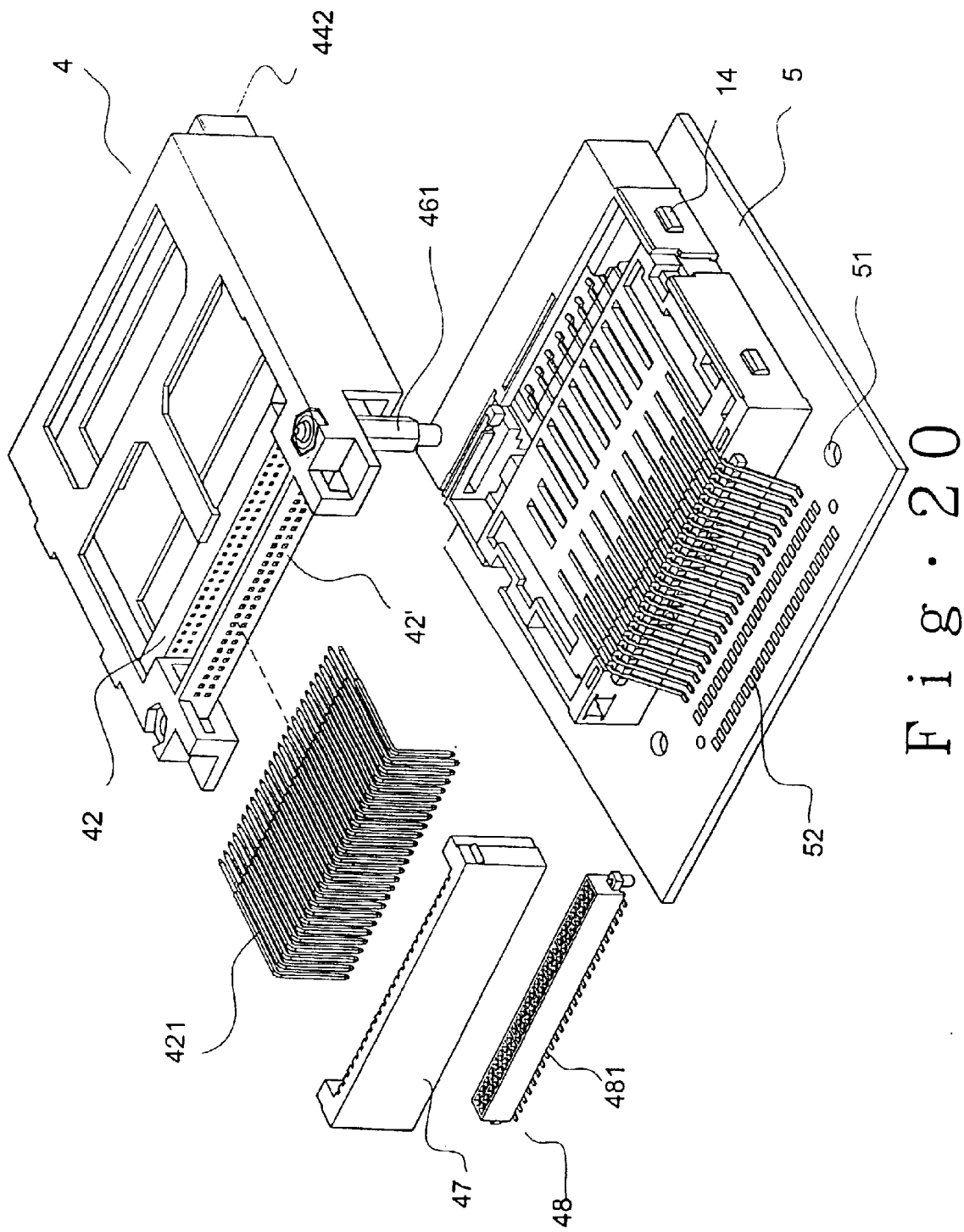
FIG. 20 is a 3D exploded view of another preferred embodiment implemented according to this invention.
Figure 21:
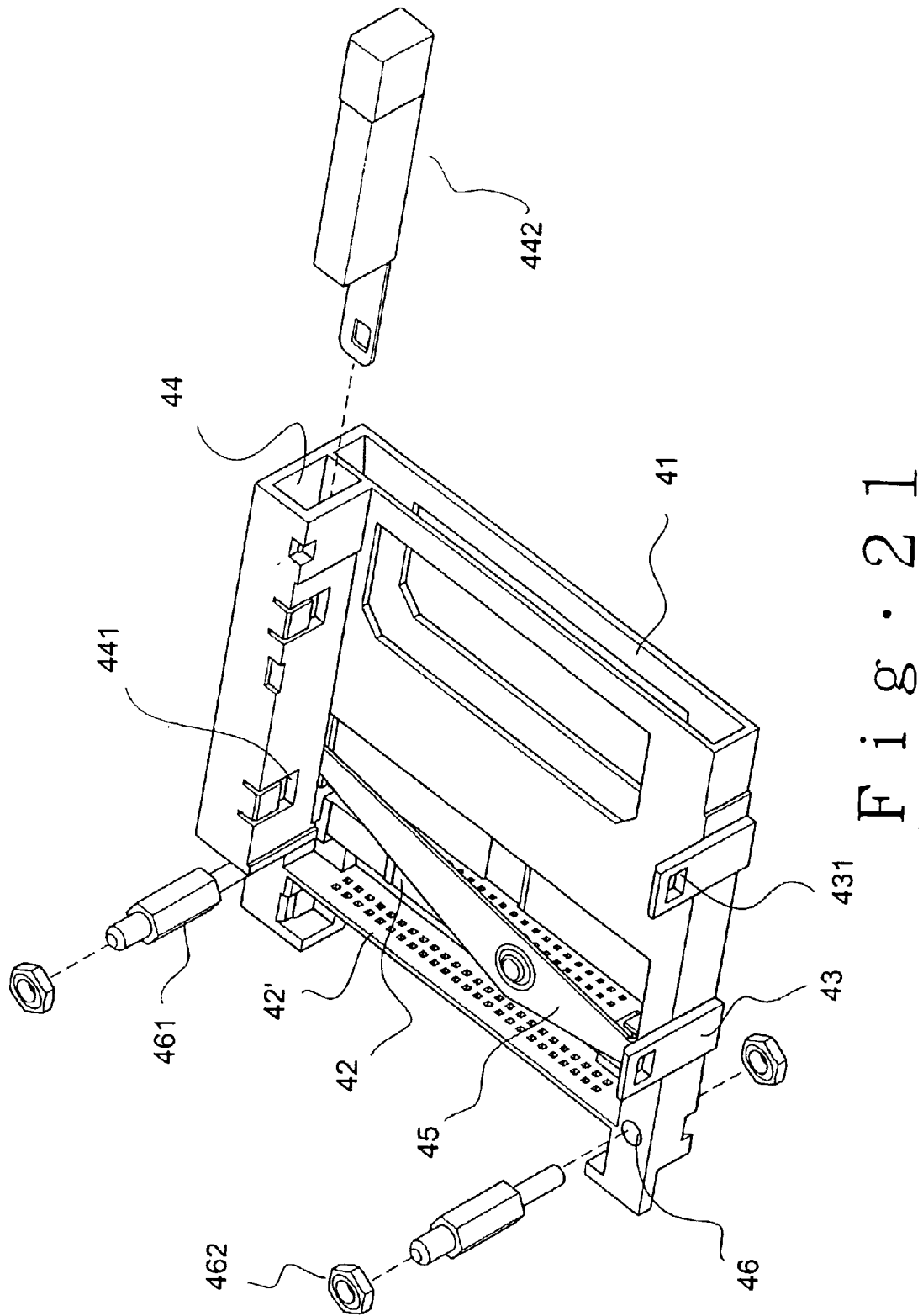
FIG. 21 and FIG. 22 is an abridged general view of the structure of the memory card connector in another preferred embodiment implemented according to this invention.
Figure 25:
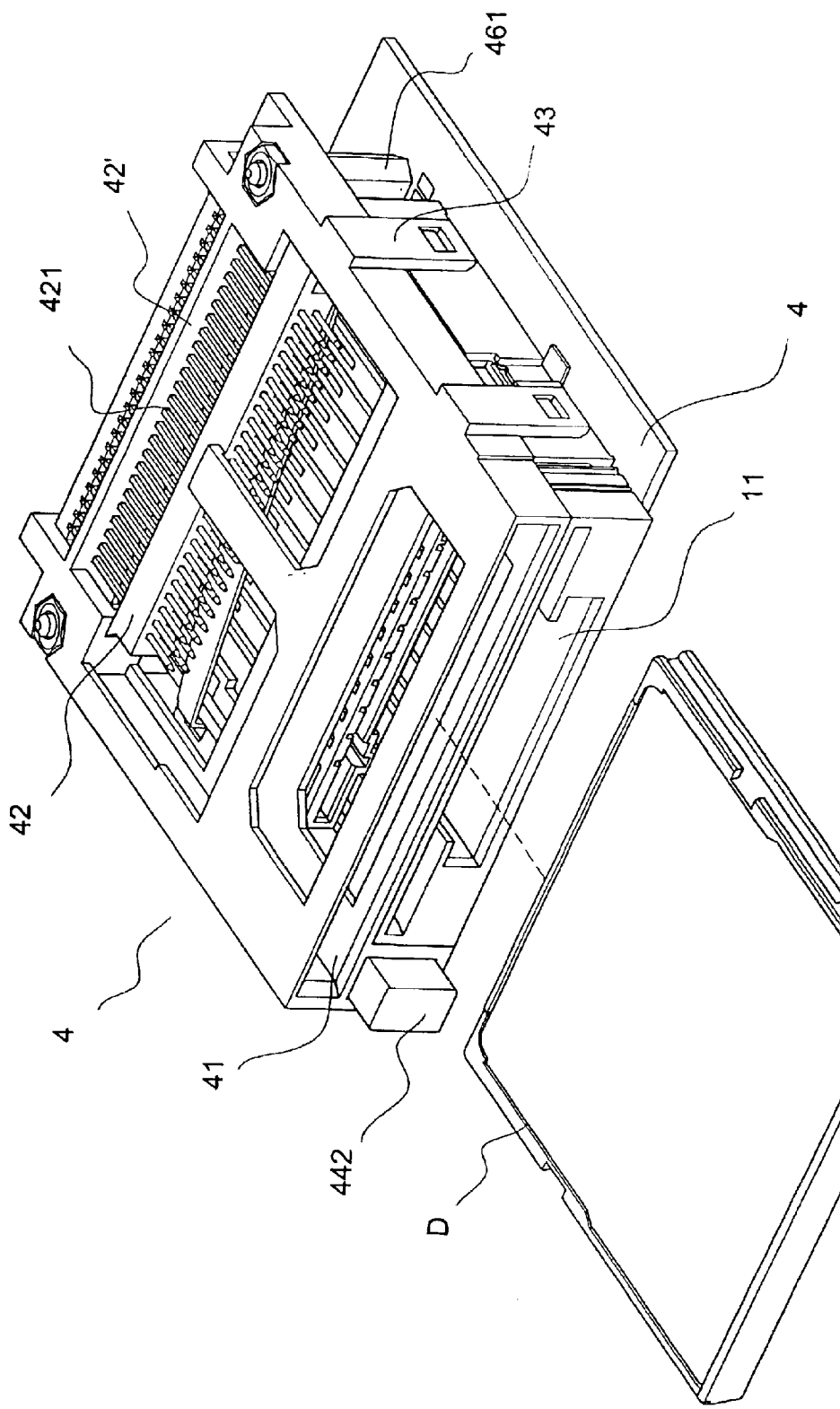
FIG. 25 is an application view of another preferred embodiment implemented according to this invention.

In addition, when the cover 3 is removed from the main body 1, the memory card connector can be coupled with another memory card connector 4 with the bulges 14 on the main body 1 (refer to FIG. 20). The main body 1 can be welded on a circuit board 5 through its terminals 151, 161 and other components. The circuit board 5 has preset through holes 51, contacts 52, and circuits to work with different memory cards with the help of the connecting grooves 47 and the connecting ports 48. The memory card connector 4 has an opening 41 to enable insertion of different cards (refer to FIG. 25) on one end and terminal seats 42, 42' to fix terminals 421 on the other end. The terminal seats 42, 42' have a groove 44 on each side to couple with a pressing part 442 (refer to FIG. 210), and each groove 44 has a plurality of location holes 441 in it. The pressing parts 442 work with the pushing rod 45 in the terminal seat 42 to constitute a card ejecting part. The memory card connector 4 has a plurality of coupling parts extending from on side and a plurality of through holes 46 at certain positions to host some fixing rods 461.

Figure 22:
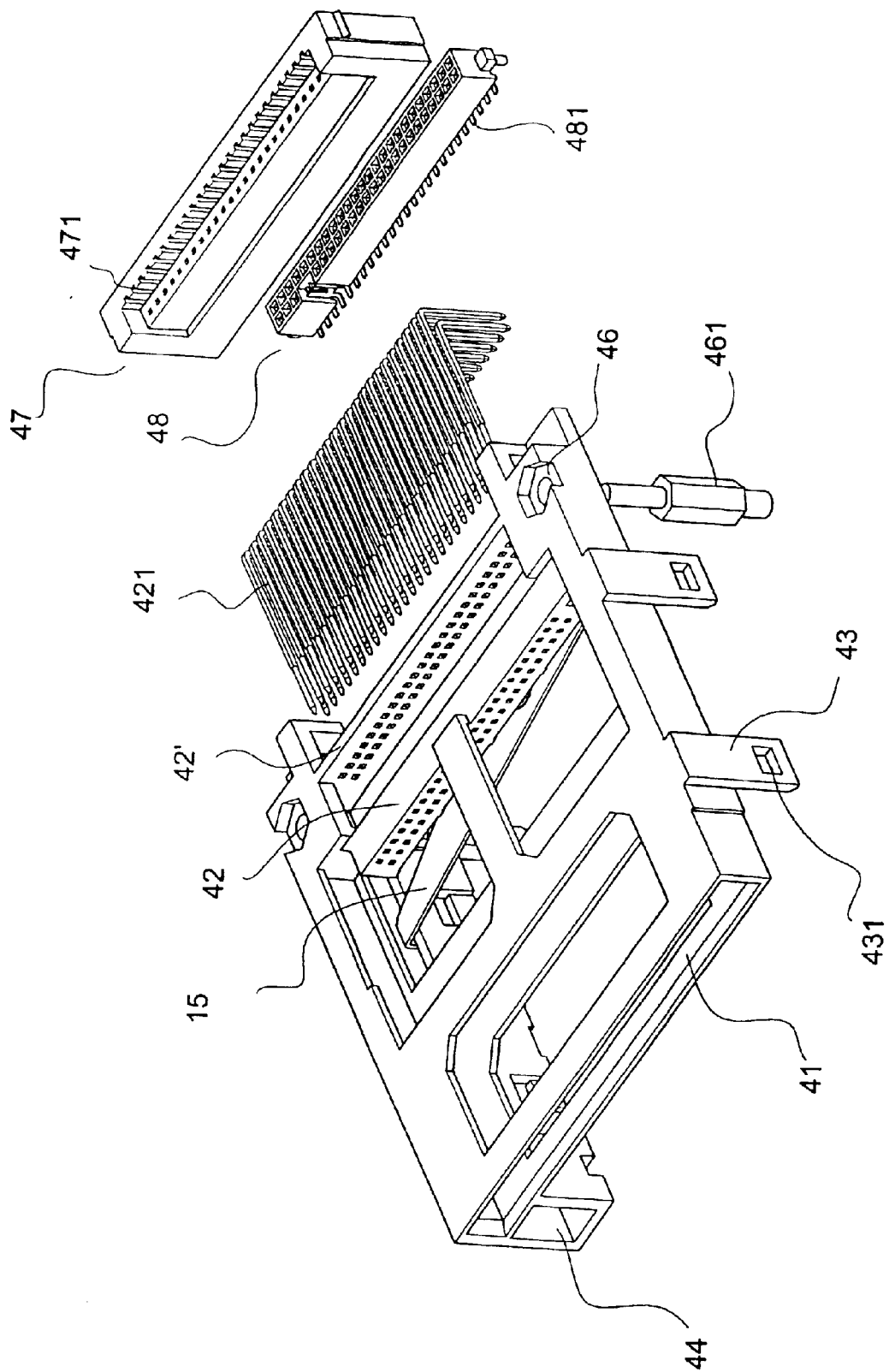
Figure 23:
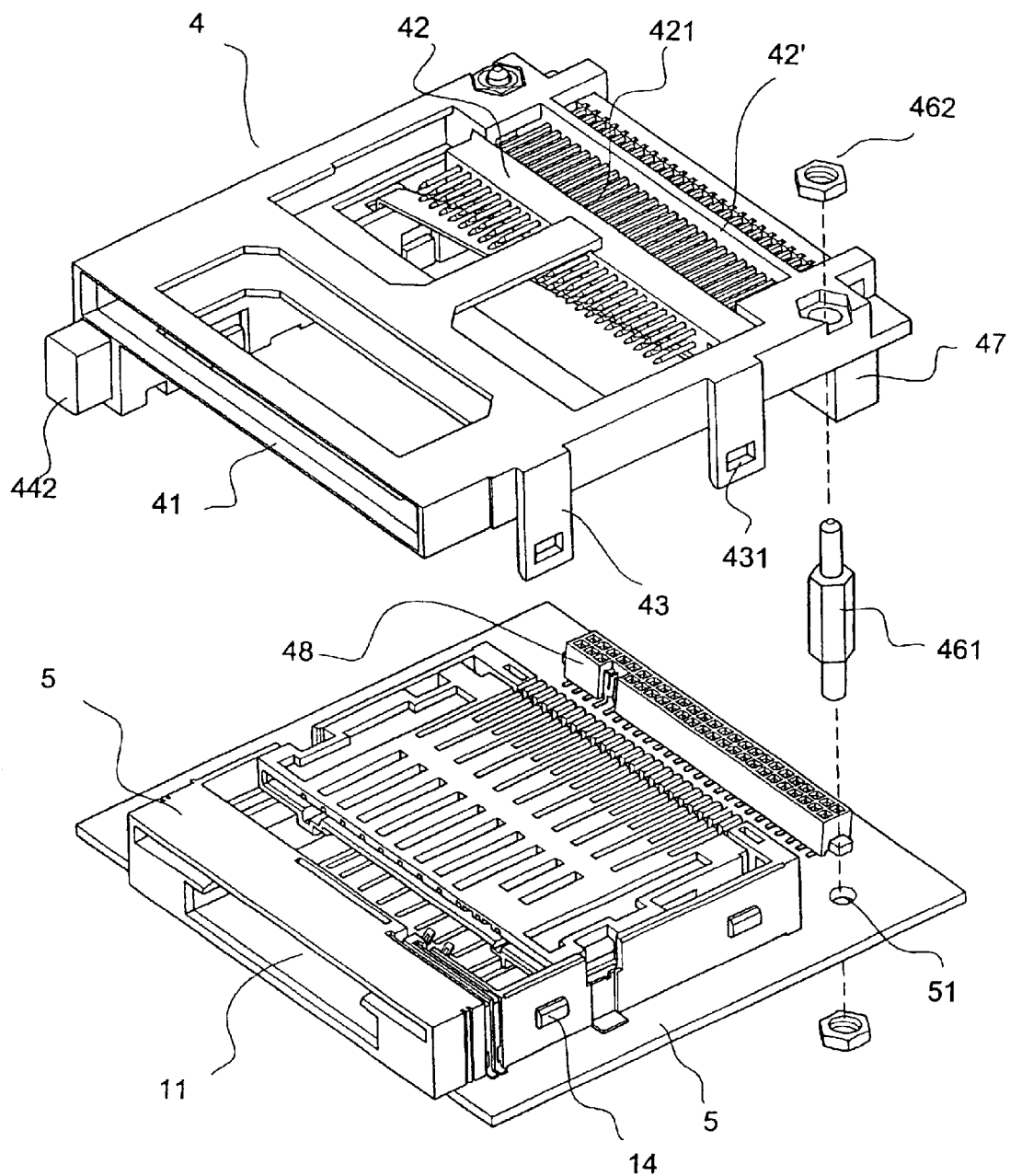
FIG. 23 is an assembly view of another preferred embodiment implemented according to this invention.
Figure 24:
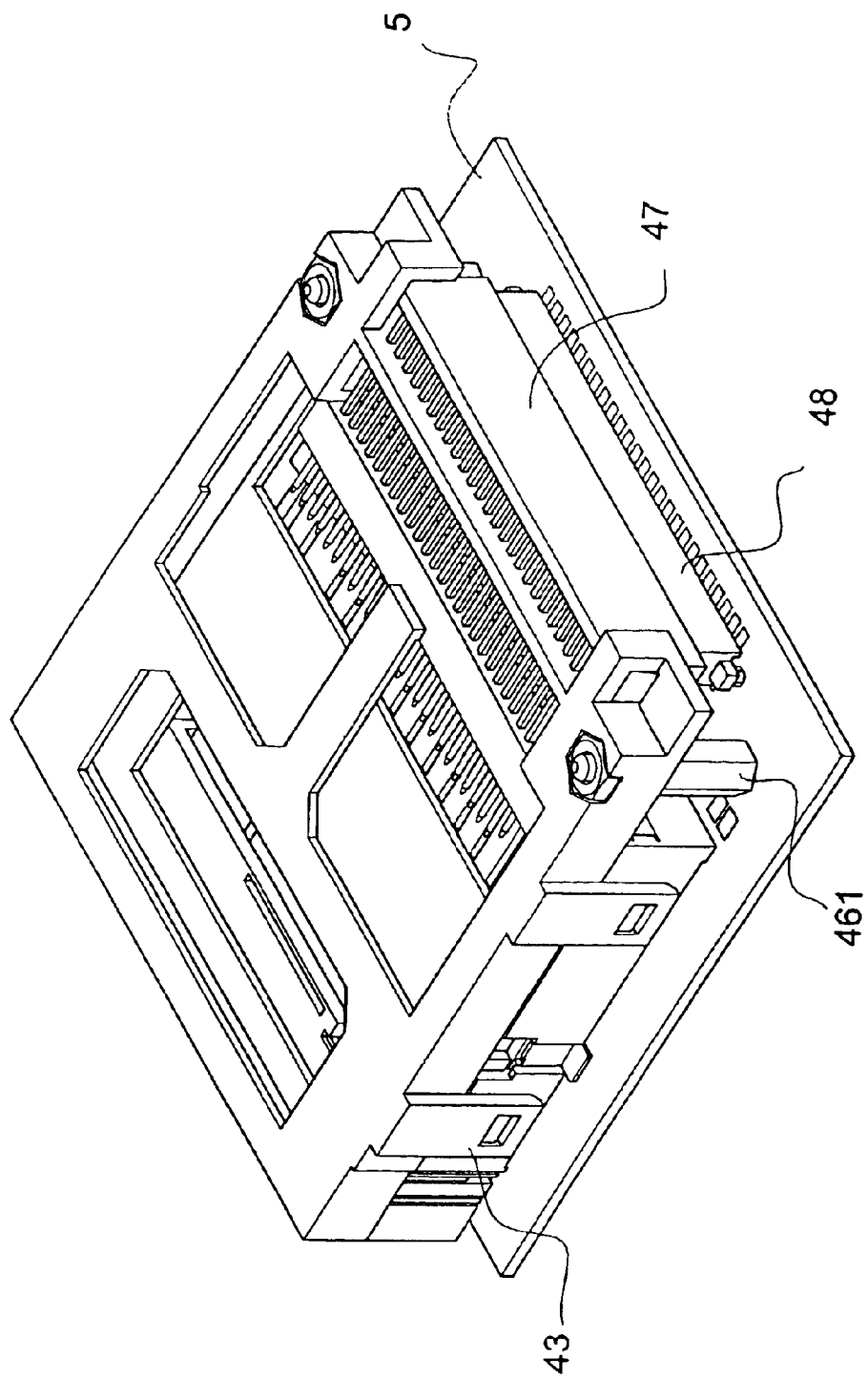
FIG. 24 is a 3D assembly view of another preferred embodiment implemented according to this invention.

In assembly, firstly, insert one ends of the terminals 421 into the terminal seats 42, 42' (refer to FIG. 22); insert the other ends of the terminals 421 into the jacks 471 in the connecting groove 47; fix the legs 481 of the connecting port 48 onto the circuit board 5, against the contacts; the coupling parts 43 and the location holes 431, 441 in the guided groove 44 on the memory card connector 4 can be fastened to the bulges 14 on the main body 1, and the fixing rods 46 can fix the memory card connector 4 onto the circuit board 5 with the bolts 462 (refer to FIG. 23); finally, insert the terminals 121 into the connecting port 3 (refer to FIG. 24) to finish the assembly. In this way, the user can substitute the memory card connector 4 with an expected one to form an assembly that can work with different memory cards, without significantly increasing the size and the cost of the assembly.

From above description we can see that the memory card connector in this invention can avoid abrasion of the chip on memory cards, helps to verify the correct insertion of memory cards, avoid misejection of memory cards, and be coupled with other memory card connectors to enable insertion of different memory cards at the same time significantly increasing the size and cost of the structure. Thus the inventor applies for a new patent for it.

Above description are only for some preferred embodiments of the invention and shall not be deemed to constitute any limitation to the application scope of this invention. Any implementation will equivalent modifications or embellishments shall fall into the concept of this invention.

What is claimed is:

1. A memory cart connector, comprising a main body, providing an opening and a first terminal seat at the front end thereof, providing a second terminal seat and a first set of jacks at the rear end thereof, providing an elongated through hole at two lateral sides thereof respectively with a plurality of bulge spots extending outward the lateral sides, and providing a containing part therein;

a slide plate, providing an opening at the front end thereof corresponding to the opening of the main body, providing a second set of jacks extending to the rear end thereof with each of the jacks having a first guide chamber, providing a plurality of hooking parts extending downward from two lateral sides of for being received in the elongated through hole respectively and being able to slide in the containing part of the main body; and a cover, providing a plurality of engaging through holes at two later sides thereof corresponding to the bulge spots for being secured by way of the engaging though holes engaging with the bulge spots;

wherein, the main body further provides a halt prevention hook located at a rear corner of the containing part and a slide rail located at another rear corner of the containing part; and the slide plate, further provides a plurality of slots at the bottom thereof extending to the rear end thereof, a fixing seat disposed outside a lateral side at the lower part of the opening thereof to fixedly attached with a guided rod for contacting with the slide nil, a blocking part next to the fixing seat, a hook disposed at two rear lower corners for engaging an end of a spring respectively, a guided groove disposed at another lateral side of the opening thereof opposite to the fixing seat with an end of guided groove being a bulge and another end of the guided groove being a blocking part for movably hosting a rod;

whereby, once the terminal seat, the Jack sets and the slots are mounted with a plurality of terminals and another end of the spring is joined to the main body, the memory card connector can be inserted with three different types of memory cards in a way of avoiding abrasion of the memory cards.

2. The memory card connector as defined in claim 1, wherein the slide rail has a first, second, third and a fourth notch in different height.

3. The memory card connector as defined in claim 1, wherein the rod has a connecting part, a second guided chamber and flange.

4. The memory card connector as defined in claim 3, wherein the halt prevention hook can be pressed with the second guided chamber while one of the memory cards is inserted and the halt prevention hook has an extending part keeps propping the flange of the rod in case of the memory card being incorrectly inserted.

5. The memory card connector as defined in claim 1, wherein the bulge spot on the main body can be used for joining another memory card connector instead of engaging with the cover.

* * * * *